US010967380B2

(12) United States Patent
Johnson et al.

(10) Patent No.: US 10,967,380 B2
(45) Date of Patent: Apr. 6, 2021

(54) HEAVY DUTY MATERIAL PROCESSOR

(71) Applicant: STANLEY BLACK & DECKER, INC., New Britain, CT (US)

(72) Inventors: Karl Johnson, Duluth, MN (US); Clayton Sederberg, Duluth, MN (US); Shane Bubacz, Duluth, MN (US); Matthew George Mecklin, Two Harbors, MN (US)

(73) Assignee: STANLEY BLACK & DECKER, INC., New Britain, CT (US)

( * ) Notice: Subject to any disclaimer, the term of this patent is extended or adjusted under 35 U.S.C. 154(b) by 129 days.

(21) Appl. No.: 15/765,676

(22) PCT Filed: Mar. 29, 2018

(86) PCT No.: PCT/US2018/025277
§ 371 (c)(1),
(2) Date: Apr. 3, 2018

(87) PCT Pub. No.: WO2018/183761
PCT Pub. Date: Oct. 4, 2018

(65) Prior Publication Data
US 2019/0085531 A1 Mar. 21, 2019

Related U.S. Application Data

(60) Provisional application No. 62/479,708, filed on Mar. 31, 2017.

(51) Int. Cl.
*B02C 1/06* (2006.01)
*B02C 1/10* (2006.01)
(Continued)

(52) U.S. Cl.
CPC .................. *B02C 1/06* (2013.01); *B02C 1/10* (2013.01); *B23D 17/06* (2013.01); *B23D 35/002* (2013.01); *E02F 3/965* (2013.01)

(58) Field of Classification Search
CPC ............... B02C 1/10; B02C 1/06; E02F 3/965
See application file for complete search history.

(56) References Cited

U.S. PATENT DOCUMENTS

| 1,917,431 A | 7/1933 | Clark |
| 2,242,363 A | 5/1941 | Michon |
| (Continued) | | |

FOREIGN PATENT DOCUMENTS

| DE | 525 385 | 5/1931 |
| DE | 26 46 565 | 6/1977 |
| (Continued) | | |

OTHER PUBLICATIONS

International Preliminary Report on Patentability issued in corresponding International Patent Application No. PCT/US2018/025277, dated May 17, 2019.

(Continued)

*Primary Examiner* — Faye Francis
(74) *Attorney, Agent, or Firm* — Pillsbury Winthrop Shaw Pittman LLP

(57) ABSTRACT

Heavy-duty material processors (e.g., shears, concrete crushers) include a jaw that pivotally connects to another jaw. A hydraulic cylinder extends between the jaws to open and close the jaws in a shearing motion. Cutting/shearing/crushing blade inserts mount to detachable blade holders, which in turn mount to one of the jaws. Wedge blocks securely and detachably attach the blade inserts to the remainder of their associated jaw, and rely on force-amplifying wedge surfaces to ensure a secure attachment. The detachable blade holders may include lateral flanges that extend across an otherwise exposed face of their respective underlying jaw bodies to protect the jaw bodies during use. A blade on one of the jaws is laterally adjustable, which (Continued)

helps to free a jam if one of the jaws gets jammed into the space between blades in the other jaw.

23 Claims, 20 Drawing Sheets

(51) Int. Cl.
  *E02F 3/96* (2006.01)
  *B23D 17/06* (2006.01)
  *B23D 35/00* (2006.01)

(56) References Cited

U.S. PATENT DOCUMENTS

| | | | |
|---|---|---|---|
| 3,039,343 | A | 6/1962 | Richards |
| 3,134,286 | A | 5/1964 | Judd |
| 4,180,926 | A | 1/1980 | Klett et al. |
| 4,512,699 | A | 4/1985 | Jackson et al. |
| 4,571,968 | A * | 2/1986 | Kanno ............... B23D 17/06 72/331 |
| 4,776,093 | A | 10/1988 | Gross |
| 4,850,732 | A | 7/1989 | Swanson |
| 4,891,732 | A | 1/1990 | Jones |
| 4,934,857 | A | 6/1990 | Swanson |
| 5,141,357 | A | 8/1992 | Sherman et al. |
| 5,183,216 | A | 2/1993 | Wack |
| 5,231,908 | A | 8/1993 | Skvarce et al. |
| 5,292,079 | A | 3/1994 | Zakohji |
| 5,474,242 | A | 12/1995 | Rafn |
| 5,531,007 | A | 7/1996 | Labounty |
| 5,542,180 | A | 8/1996 | Karani |
| 5,619,881 | A | 4/1997 | Morikawa et al. |
| 5,638,621 | A | 6/1997 | Keech et al. |
| 5,873,168 | A | 2/1999 | Johnson et al. |
| 5,926,958 | A | 7/1999 | Ramun |
| 5,926,982 | A | 7/1999 | Keech et al. |
| 5,937,550 | A | 8/1999 | Emrich |
| 5,940,971 | A | 8/1999 | Ramun |
| 5,992,023 | A | 11/1999 | Sederberg et al. |
| 6,041,529 | A | 3/2000 | Ruvang |
| 6,061,911 | A | 5/2000 | Labounty et al. |
| 6,119,970 | A | 9/2000 | Labounty et al. |
| 6,202,308 | B1 | 3/2001 | Ramun |
| 6,298,560 | B1 | 10/2001 | Lee |
| 6,766,973 | B2 | 7/2004 | Muri |
| 6,926,217 | B1 | 8/2005 | Labounty et al. |
| 7,213,778 | B2 * | 5/2007 | Astafan ............... B02C 18/141 241/197 |
| 7,216,575 | B2 | 5/2007 | Alseth et al. |
| 7,300,009 | B2 * | 11/2007 | Dallimore ............ B02C 13/1842 241/275 |
| 7,354,010 | B2 | 4/2008 | Ramun et al. |
| 8,061,643 | B2 * | 11/2011 | Gingras ................. D21D 1/30 241/298 |
| 8,104,384 | B2 | 1/2012 | Wilkins et al. |
| 8,146,256 | B2 | 4/2012 | Johnson et al. |
| 8,231,071 | B2 | 7/2012 | Ramun et al. |
| 8,262,007 | B2 * | 9/2012 | Okuya ................... B02C 1/10 241/264 |
| 8,434,705 | B2 * | 5/2013 | Lipowski ............. B02C 18/14 241/239 |
| 8,628,035 | B2 | 1/2014 | Ramun |
| 8,646,709 | B2 | 2/2014 | Ramun et al. |
| 8,650,759 | B2 | 2/2014 | Johnson et al. |
| 8,887,416 | B2 | 11/2014 | Ostermeyer |
| 8,967,515 | B2 * | 3/2015 | Pallmann ............ B02C 18/145 241/294 |
| 9,132,490 | B2 | 9/2015 | Ramun |
| 2005/0150343 | A1 | 7/2005 | Deimel et al. |
| 2008/0028619 | A1 | 2/2008 | Bubacz et al. |
| 2008/0072434 | A1 | 3/2008 | Clemons et al. |
| 2011/0225829 | A1 | 9/2011 | Raihala |
| 2014/0319257 | A1 | 10/2014 | Clemons |
| 2014/0326123 | A1 | 11/2014 | Hall |
| 2014/0331843 | A1 | 11/2014 | Hall |
| 2016/0001293 | A1 | 1/2016 | Raihala |
| 2016/0145830 | A1 | 5/2016 | Clemons |
| 2016/0175951 | A1 | 6/2016 | Kneisley et al. |
| 2019/0193084 | A1 * | 6/2019 | Brouwers ............ B23D 35/002 |

FOREIGN PATENT DOCUMENTS

| | | |
|---|---|---|
| EP | 0 529 380 | 3/1993 |
| EP | 0 666 131 | 8/1995 |
| GB | 1 028 544 | 5/1966 |
| GB | 1 432 510 | 4/1976 |
| GB | 1 485 516 | 9/1977 |
| GB | 1 564 149 | 4/1980 |
| KR | 101525797 | 6/2015 |
| WO | WO 96/11057 | 4/1996 |
| WO | 2018/183761 | 10/2018 |

OTHER PUBLICATIONS

International Search Report and Written Opinion issued for corresponding International Patent Application No. PCT/US2018/025277, dated Sep. 6, 2018.

Extended Search Report issued for corresponding European Patent Application No. 19197616.6, dated Mar. 4, 2020.

* cited by examiner

HEAVY DUTY MATERIAL PROCESSOR

CROSS REFERENCE

This application is the U.S. National Stage of PCT/US2018/025277, filed Mar. 29, 2018, which in turn claims the benefit of priority from U.S. Provisional Application No. 62/479,708, filed Mar. 31, 2017, titled "HEAVY DUTY MATERIAL PROCESSOR," the entire contents of which are hereby incorporated by reference herein.

BACKGROUND

1. Field of the Invention

The invention relates generally to heavy duty demolition shears, and more particularly to replaceable blade inserts for such shears and/or the unjamming of such shears.

2. Description of Related Art

Conventional heavy-duty demolition shears are configured attach to the boom structure of, for example, excavating or earth-moving excavation equipment such as that made by Caterpillar, Komatsu, Hitachi, Kobelco, etc. The shears often include a lower, fixed or stationary jaw and an upper, movable jaw. The upper, movable jaw is pivotally mounted (e.g., via a pivot pin or other hinge mechanism) relative to the lower fixed or stationary jaw. A linear actuator (e.g., pneumatic or hydraulic cylinder) articulates (drives) the upper, movable jaw for such pivoting movement. The stationary jaw is mounted into a stick weldment structure that supports the actuator and the pivoting upper jaw, and the stick weldment structure is mated to the boom of the machinery via a mounting bracket or a rotational mounting adapter and rotational drive system. Replaceable blade inserts are bolted to the jaws so as to be repositionable (indexable) and replaceable. An example of such heavy-duty shears is disclosed in U.S. Pat. No. 8,146,256, the entirety of which is incorporated herein by reference.

SUMMARY

One or more embodiments include detachably mounted blade holders that are detachably mounted to a remainder of the associated shear jaw. Blade inserts, in turn, mount to the blade holders. According to various non-limiting embodiments, the use of detachable blade holders may facilitate smaller blade inserts, and better wear protection for the main jaw bodies of the shears.

One or more embodiments utilize wedge blocks with wedge surfaces that tightly secure the blade inserts to their respective jaws.

One or more embodiments include a lateral blade adjustment mechanism to adjust a lateral position of a blade of the shears, which may help to facilitate the unjamming of a jammed shears.

One or more non-limiting embodiments provide a material processor that includes: a first jaw with a first material-processing surface feature; and a second jaw with a second material-processing surface feature, wherein the first and second jaws are pivotally connected such that at least one of the jaws is pivotally movable relative to the other jaw. The first jaw includes: a first jaw body with a first blade seat surface, a first blade insert seated on the first blade seat surface, the blade insert defining at least a portion of the first material-processing surface feature, a wedge block having (a) a first wedge surface that engages a surface of the first jaw body, and (b) a second wedge surface that engages a surface of the first blade insert, and a fastener that mounts the wedge block to the first jaw, the fastener applying a force to the wedge block in a force-applying direction that is angled relative to one of the wedge surfaces such that (1) the force urges the first blade insert into engagement with first blade seat surface in the force-applying direction, and (2) the force urges, via the wedge surfaces, the first blade insert into engagement with the first blade seat surface in a direction different from the force-applying direction.

According to one or more of these embodiments: the material processor includes a shears; the first material-processing surface feature includes a first cutting edge; the second material-processing surface feature includes a second cutting edge; and the second cutting edge is shaped and positioned to shearingly interact with the first cutting edge when the at least one of the jaws pivots in a shearing motion.

According to one or more of these embodiments, the processor includes a piston/cylinder operatively connected to the first and second jaws and configured to pivotally drive the at least one of the jaws relative to the other jaw.

According to one or more of these embodiments, the first blade insert comprises a low-friction coating on at least one wear surface thereof.

According to one or more of these embodiments, the first and second wedge surfaces form a non-zero acute angle with each other.

According to one or more of these embodiments: the first jaw body includes a first main body and a first detachable blade holder that is detachably mounted to the first main body, the first detachable blade holder includes (1) the first blade seat surface and (2) the surface of the first jaw body that engages the first wedge surface, and the first main body includes a first blade holder seat surface that abuts a mounting surface of the first blade holder.

According to one or more of these embodiments, the first detachable blade holder includes two segments that intersect each other at an angle, an inside edge is formed in the first blade seat surface along the intersection between the two segments, an outside edge is formed in the mounting surface of the first blade holder along the intersection between the two segments, and the inside edge is sharper than the outside edge.

According to one or more of these embodiments, the first blade seat surface has a first surface portion that extends in a direction perpendicular to the force-applying direction, the force urges the first blade insert into engagement with the first surface portion, the first blade seat surface has a second surface portion that extends in a direction parallel to the force-applying direction, and the force urges, via the wedge surfaces, the first blade insert into engagement with the second surface portion.

According to one or more of these embodiments, the first blade seat surface includes first and second surface portions that abut mating surfaces of the first blade insert, and the first and second surface portions intersect each other at an inside edge.

According to one or more of these embodiments, the material processor is a shears; the first material-processing surface feature includes a first cutting edge; the first blade insert is at least two-way indexable such that the first blade insert includes at least the first cutting edge and a second cutting edge; and the second cutting edge extends along the inside edge formed between the first and second surface portions of the first blade seat surface.

According to one or more of these embodiments, the first blade insert comprises a low-friction coating on at least two opposing wear surfaces thereof.

According to one or more of these embodiments, the first blade insert is at least four-way indexable such that the first blade insert includes third and fourth cutting edges, wherein the first blade insert may be repositioned such that any one of the first through fourth cutting edges is disposed in an exposed working position for shearing action during the shearing motion.

According to one or more of these embodiments, the mounting surface of the first blade holder includes first and second segments that intersect each other along an outside edge that is less sharp than the first cutting edge.

According to one or more of these embodiments: the first blade insert is at least two-way indexable, and includes first and second shearing wear surfaces on first and second sides of the first blade insert, respectively; the first side is opposite the second side; and the first and second shearing wear surfaces each have a low-friction coating.

According to one or more of these embodiments, a front nose portion of one of the jaws includes a detachable piercing tip that includes a bulging piercing edge.

According to one or more of these embodiments, the bulging piercing edge is round.

According to one or more of these embodiments, the first jaw includes a first guide surface; and the second jaw includes a guide blade that defines a second guide surface that faces toward the second material-processing surface feature such that a space is formed between the second material-processing surface feature and the second guide surface, wherein sufficient pivotal movement of the at least one of the jaws would cause at least a portion of the first jaw to move into the space, and a lateral actuator that is configured to selectively move the second guide blade relative to the second material-processing surface feature so as change a lateral width of the space.

According to one or more of these embodiments: the first jaw body comprises a first main body and a first detachable blade holder that is detachably mounted to the first main body; the first detachable blade holder comprises a first segment, a second segment that extends laterally away from the first segment in a direction of the first blade insert, and a third segment that extends laterally away from the first segment; the first and second segments together define the first blade seat surface; and the third segment at least partially covers a surface of the first main body that faces the second jaw.

One or more non-limiting embodiments provide a blade insert shaped and configured to be mounted to a jaw of a material processor. The insert includes: an insert body with first and second surfaces disposed on opposite sides thereof; a first material-processing surface feature; and a through hole extending from the first surface to the second surface and forming a first wedge surface, wherein the first wedge surface forms an angle π with the first surface. According to various embodiments, the angle π deviates from 90 degrees by (a) at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, and/or 35 degrees, (b) less than 50, 40, 35, 30, 29, 28, 27, 26, 25, 24, 23, 22, 21, 20, 19, 18, 17, 16, 15, 14, 13, 12, 11, 10, 9, 8, 7, 6, and/or 5 degrees, and/or (c) between any two such values (e.g., between 1 and 50 degrees, between 5 and 30 degrees, between 5 and 25 degrees, between 5 and 20 degrees, between 5 and 15 degrees).

According to one or more of these embodiments, the first wedge surface is planar.

According to one or more of these embodiments, the first wedge surface is not rotationally symmetric.

According to one or more of these embodiments, the angle π is less than 20, 15, and/or 10 degrees.

According to one or more of these embodiments, the first material-processing surface feature includes a first cutting edge at an edge of the first surface.

According to one or more of these embodiments: the insert is at least two-way indexable; a second cutting edge is disposed at an edge of one of the first and second surfaces; and the hole forms a second wedge surface, the second wedge surface forming an angle with the first surface that deviates from 90 degrees by between 5 and 25 degrees.

According to one or more of these embodiments, the first surface has a low-friction coating, and wherein the second surface has a low-friction coating.

According to one or more of these embodiments: the insert is at least four-way indexable; the second cutting edge is disposed at an edge of the first surface; the insert includes third and fourth cutting edges disposed at edges of the second surface; and the hole forms third and fourth wedge surfaces, wherein each of the first, second, third, and fourth wedge surfaces form angles with the first surface that deviate from 90 degrees by between 5 and 25 degrees.

According to one or more of these embodiments, in a cross-section taken in a plane that is parallel to the first surface, a perimeter of the hole is rectangular, "D" shaped, or takes any other suitable shape.

According to one or more of these embodiments, at least a portion of the hole has the shape of a rectangular pyramidal frustum.

According to one or more of these embodiments, the through hole is not threaded.

According to one or more of these embodiments, the insert does not include a threaded surface.

According to one or more of these embodiments, the through hole is formed by water-jetting.

According to one or more of these embodiments, at least one of the first and second surfaces of the insert body has a low-friction coating.

According to one or more of these embodiments, the first and second surfaces of the insert body each have a low-friction coating.

One or more embodiments provide a material processor that includes: a first jaw with a first material-processing surface feature and a first guide surface; a second jaw that includes a second material-processing surface feature, and a guide blade that defines a second guide surface that faces toward the second material-processing surface feature such that a space is formed between the second material-processing surface feature and the second guide surface, wherein the first and second jaws are pivotally connected to each other such that at least one of the jaws is pivotally movable relative to the other jaw, wherein sufficient pivotal motion of the at least one of the jaws would cause at least a portion of the first jaw to move into the space; a lateral actuator that is configured to selectively move the second guide blade relative to the second material-processing surface feature so as to change a lateral width of the space; and a piston/cylinder operatively connected to the first and second jaws and configured to pivotally drive the at least one of the jaws relative to the other jaw.

According to one or more of these embodiments, the lateral actuator includes a jackscrew that threadingly engages a threaded portion of the second jaw, the jackscrew being mounted to the guide blade such that threaded rotation of the jackscrew relative to the second jaw laterally moves the guide blade so as to change the lateral width of the space.

According to one or more of these embodiments, the lateral actuator may comprise a linear actuator (e.g., a hydraulic linear actuator such as a hydraulic piston/cylinder).

According to one or more of these embodiments, the processor includes a bolt that bolts the jackscrew to the guide blade to mount the jackscrew to the guide blade, wherein an axis of rotation of the bolt is coaxial with an axis of rotation of the jackscrew.

According to one or more of these embodiments, the lateral actuator is configured to change the lateral width without detaching the guide blade from a remainder of the second jaw.

According to one or more of these embodiments, the lateral actuator is configured to be used to unjam the material processor by enlarging the lateral width if the first jaw becomes jammed in the space.

According to one or more of these embodiments: the second jaw includes a jaw body and a guide blade retainer body; the jaw body and guide blade retainer body are attached to each other via at least one threaded fastener; and the guide blade is disposed at least partially between the jaw body and guide blade retainer body.

One or more embodiments provide a material processor that includes: a first jaw; a second jaw that includes a jaw body, a guide blade retainer body attached to the jaw body via at least one threaded fastener, and a guide blade mounted at least partially between the jaw body and the guide blade retainer body, wherein the first and second jaws are pivotally connected to each other such that at least one of the jaws is pivotally movable relative to the other jaw; and a piston/cylinder operatively connected to the first and second jaws and configured to pivotally drive the at least one of the jaws relative to the other jaw.

According to one or more of these embodiments: the first jaw includes a first material-processing surface feature, the second jaw includes a second material-processing surface feature, the second guide surface faces toward the second material-processing surface feature such that a space is formed between the second material-processing surface feature and the second guide surface, and sufficient pivotal motion of the at least one of the jaws would cause at least a portion of the first jaw to move into the space.

According to one or more of these embodiments: the first jaw includes a first cutting edge, the second jaw includes a second cutting edge, and sufficient pivotal motion of the at least one of the jaws would cause one of the cutting edges to move at least partially past the other of the cutting edges in a shearing manner.

According to one or more of these embodiments, the first jaw has a first guide surface, the guide blade defines a second guide surface, and the first guide surface is positioned to slide relative to the second guide surface during at least a portion of the pivotal motion.

According to one or more of these embodiments, a recess is formed between the jaw body and the guide blade retainer body, and wherein the guide blade is at least partially disposed within the slot.

According to one or more of these embodiments, the guide blade includes: a guide blade holder, and a guide blade insert mounted to the guide blade holder.

One or more embodiments provide a material processor that includes: a first jaw that includes a main body having blade holder seat surface, a detachable blade holder detachably mounted to the blade holder seat surface, the detachable blade holder including a blade seat surface, and a detachable blade insert seated on the blade seat surface and detachably mounted to the blade holder, the blade insert having a first material-processing surface feature; a second jaw with a second material-processing surface feature, wherein the first and second jaws are pivotally connected to each other such that at least one of the jaws is pivotally movable relative to the other jaw; and a piston/cylinder operatively connected to the first and second jaws and configured to pivotally drive the at least one of the jaws relative to the other jaw.

According to one or more of these embodiments, a surface of the blade holder stands out from an adjacent surface of the main body in a direction of the pivot axis.

According to one or more of these embodiments, a surface of the blade insert stands out from an adjacent surface of the blade holder in a direction of the pivot axis.

According to one or more of these embodiments, the detachable blade holder comprises a first segment, a second segment that extends laterally away from the first segment in a direction of the first blade insert, and a third segment that extends laterally away from the first segment; the first and second segments together define the blade seat surface; and the third segment comprises a jaw cover that at least partially covers a surface of the main body that faces the second jaw.

According to one or more of these embodiments, the second and third segments are substantially parallel to each other.

According to one or more of these embodiments, the first and second segments meet each other at an angle y that is between 45 and 135 degrees.

According to one or more of these embodiments, the first and third segments meet each other at an angle x that is between 45 and 135 degrees.

According to one or more of these embodiments, as viewed in cross-section, the detachable blade holder has a Z shape.

According to one or more of these embodiments, the second and third segments are offset from each other in a direction of travel of the first jaw relative to the second jaw.

One or more embodiments provide a blade holder comprising first, second, and third segments, the blade holder have a Z shape in cross-section, the first segment forming a central part of the Z, the second and third segments forming distal arms of the Z. The blade holder is shaped and configured to detachably mount to a blade holder seat of a jaw body of a material processing shears. The first and second segments form a blade insert seat surface that is shaped and configured to detachably mount to and support a detachable blade insert of the shears. The third segment comprises a jaw cover that is shaped and configured to at least partially cover a surface of the jaw body that faces an opposing jaw of the shears when the blade holder is detachably mounted to the jaw body.

According to one or more of these embodiments, the second and third segments are substantially parallel to each other.

According to one or more of these embodiments, the first and second segments meet each other at an angle y that is between 45 and 135 degrees.

According to one or more of these embodiments, the first and third segments meet each other at an angle x that is between 45 and 135 degrees.

One or more of these and/or other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

All closed-ended (e.g., between A and B) and open-ended (greater than C) ranges of values disclosed herein explicitly include all ranges that fall within or nest within such ranges. For example, a disclosed range of 1-10 is understood as also disclosing, among other ranged, 2-10, 1-9, 3-9, etc. Similarly, where multiple parameters (e.g., parameter A, parameter B) are separately disclosed as having ranges, the embodiments disclosed herein explicitly include embodiments that combine any value within the disclosed range of one parameter (e.g., parameter A) with any value within the disclosed range of any other parameter (e.g., parameter B).

BRIEF DESCRIPTION OF THE DRAWINGS

For a better understanding of various embodiments as well as other objects and further features thereof, reference is made to the following description which is to be used in conjunction with the accompanying drawings, where.

DETAILED DESCRIPTION OF EXEMPLARY EMBODIMENTS

Figure 1:
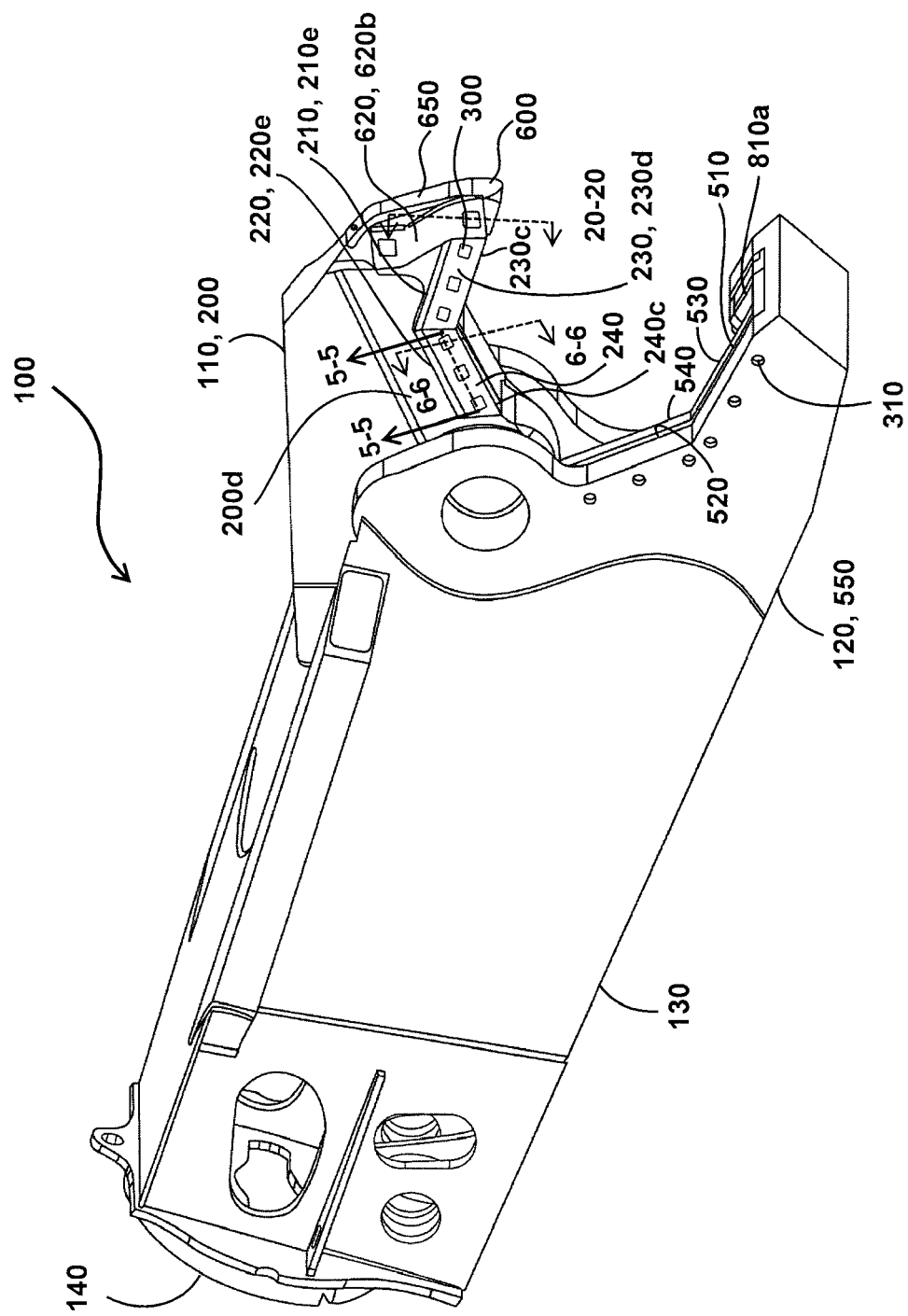
FIG. 1 is a front perspective view of a right lateral side of a shears according to one or more embodiments.
Figure 2:
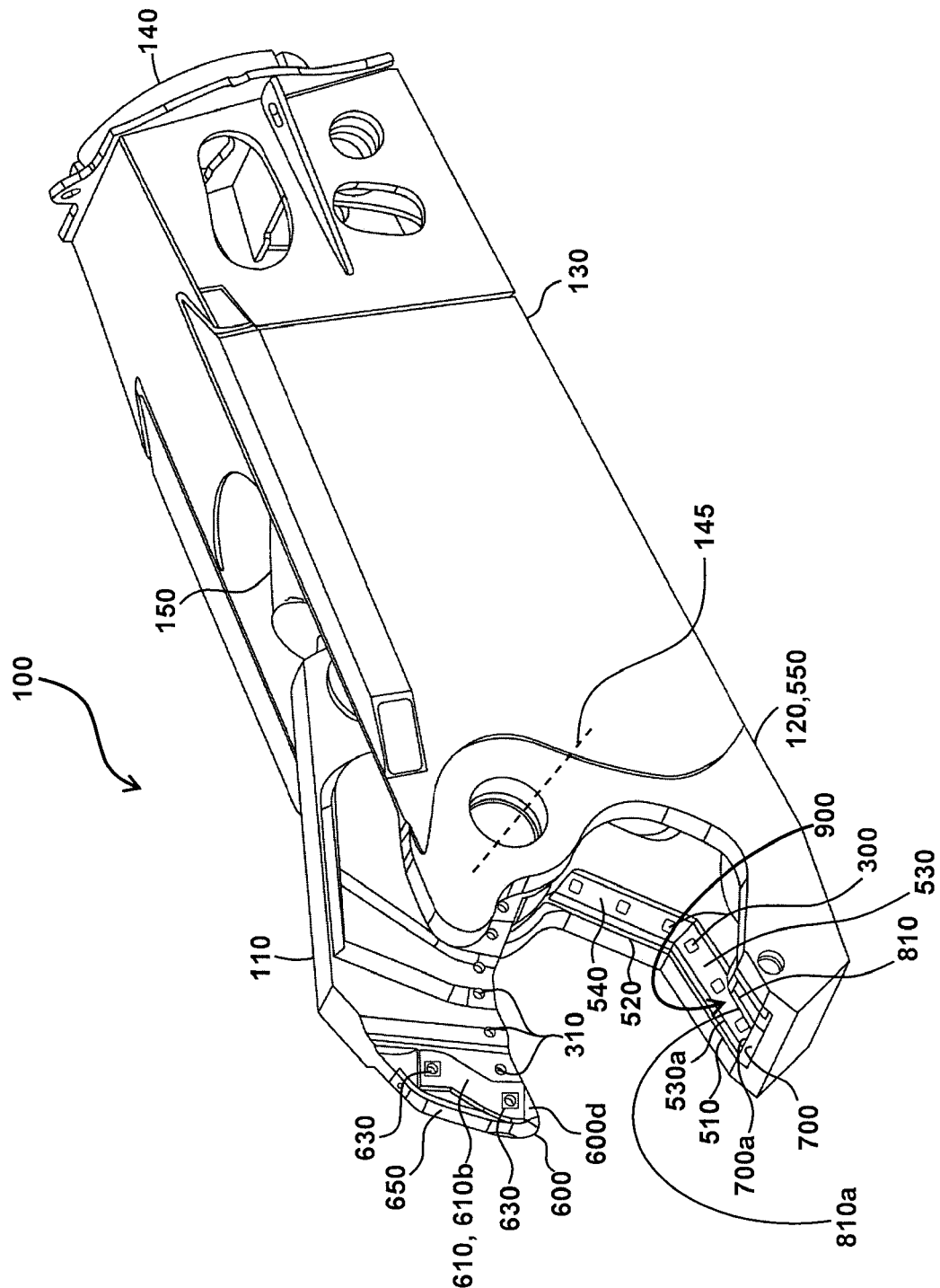
FIG. 2 is a front perspective view of a left lateral side of the shears of FIG. 1.

FIGS. 1-8, 13-14, and 20-21 illustrate a shears 100 according to one or more embodiments. As shown in FIGS. 1-2, the shears 100 include an upper, movable jaw 110 and a lower, fixed jaw 120.

As shown in FIGS. 1-2, the lower jaw 120 is rigidly mounted to a stick/frame 130 with a mounting bracket 140 that is configured to mount the shears 100 to a construction vehicle (e.g., the boom of an excavator, back hoe, etc.). For example, such a construction vehicle may be comprise excavating or earth-moving excavation equipment such as that made by Caterpillar, Komatsu, Hitachi, Kobelco, etc.

The jaws 110, 120 pivotally connect to each other at a laterally-extending pivot axis 145 such that at least one of the jaws 110, 120 is pivotally movable relative to the other jaw 110, 120. In the illustrated embodiments, the upper jaw 110 is movable relative to the lower fixed jaw 120 and stick 130. However, according to alternative embodiments, both jaws 110, 120 are movable relative to each other and a construction vehicle to which the shears 100 is attached (e.g., universal processing shears).

The pivotal connection between the jaws 110, 120 may be formed by any suitable structure (e.g., an axle and bearings, the pivotal connection disclosed in U.S. Pat. Nos. 8,146,256 or 8,104,384 or U.S. Patent Application Publication No. 2008/0028619, the entire contents of each of which are hereby incorporated herein by reference).

As shown in FIG. 2, a hydraulic piston/cylinder 150 operatively connects to the first and second jaws 110, 120 and is configured to pivotally drive the upper jaw 110 relative to the lower jaw 120 in a shearing motion to open and close the shears 100. FIGS. 1 and 2 illustrate the shears 100 in an open position. While the illustrated shears 100 use a hydraulic piston/cylinder 150 to drive the shearing motion of the jaws 110, 120, any other suitable actuator may alternatively be used without deviating from the scope of various embodiments (e.g., pneumatic piston/cylinder, linear or rotational actuator, etc.).

Hereinafter, the upper jaw 110 is described with reference to FIGS. 1, 3, 5, and 6. The upper jaw 110 includes a main upper jaw body 200 and detachable primary and secondary blade holders 210, 220. As shown in FIGS. 3, 5-6, and 21, the main upper jaw body 200 includes a blade holder seat surface 200a that mates with and abuts correspondingly shaped mounting surfaces 210a, 220a of the blade holders 210, 220, respectively.

Figure 3:
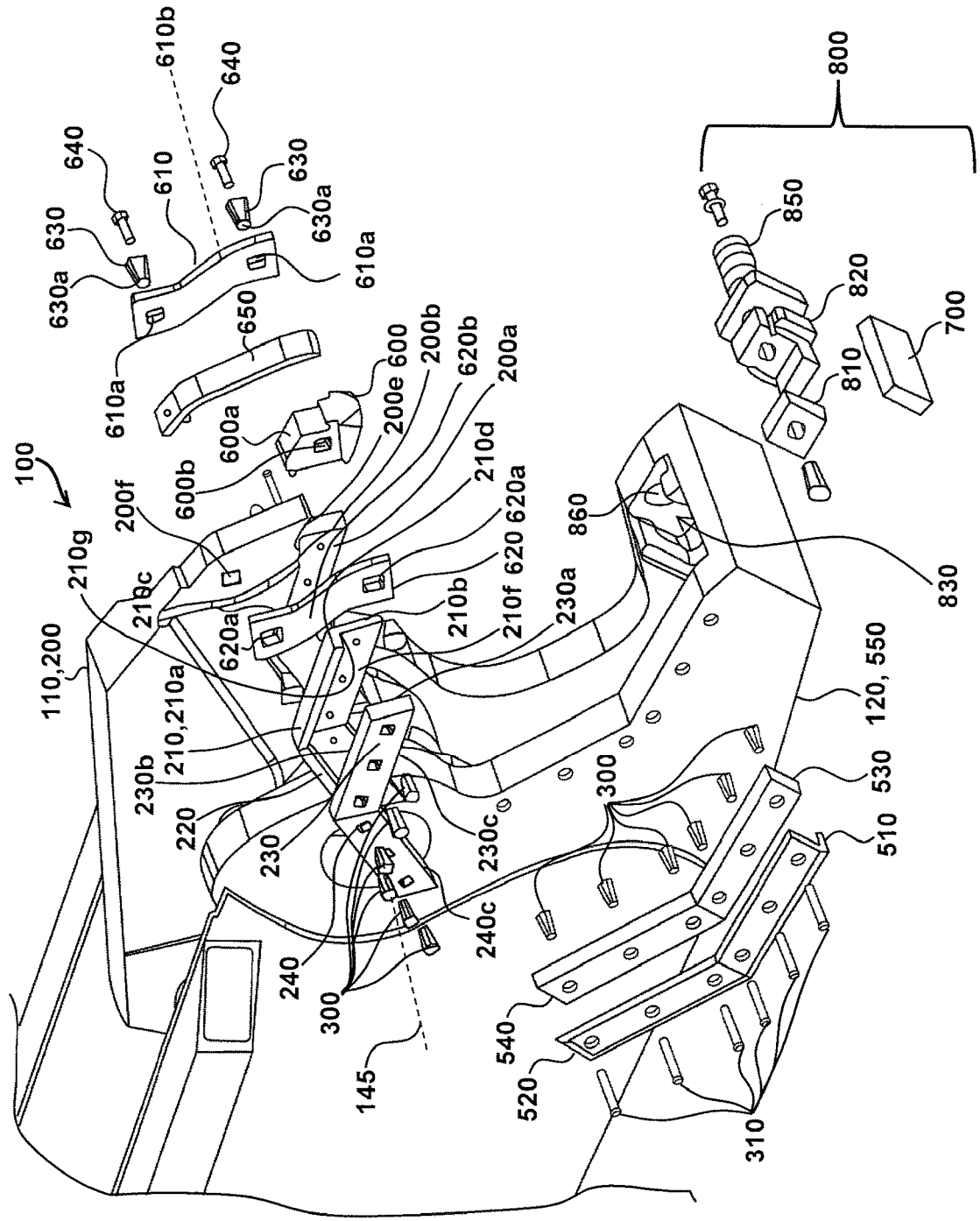
FIGS. 3 and 4 are partial exploded views of the front portion of the shears of FIG. 1.
Figure 6:
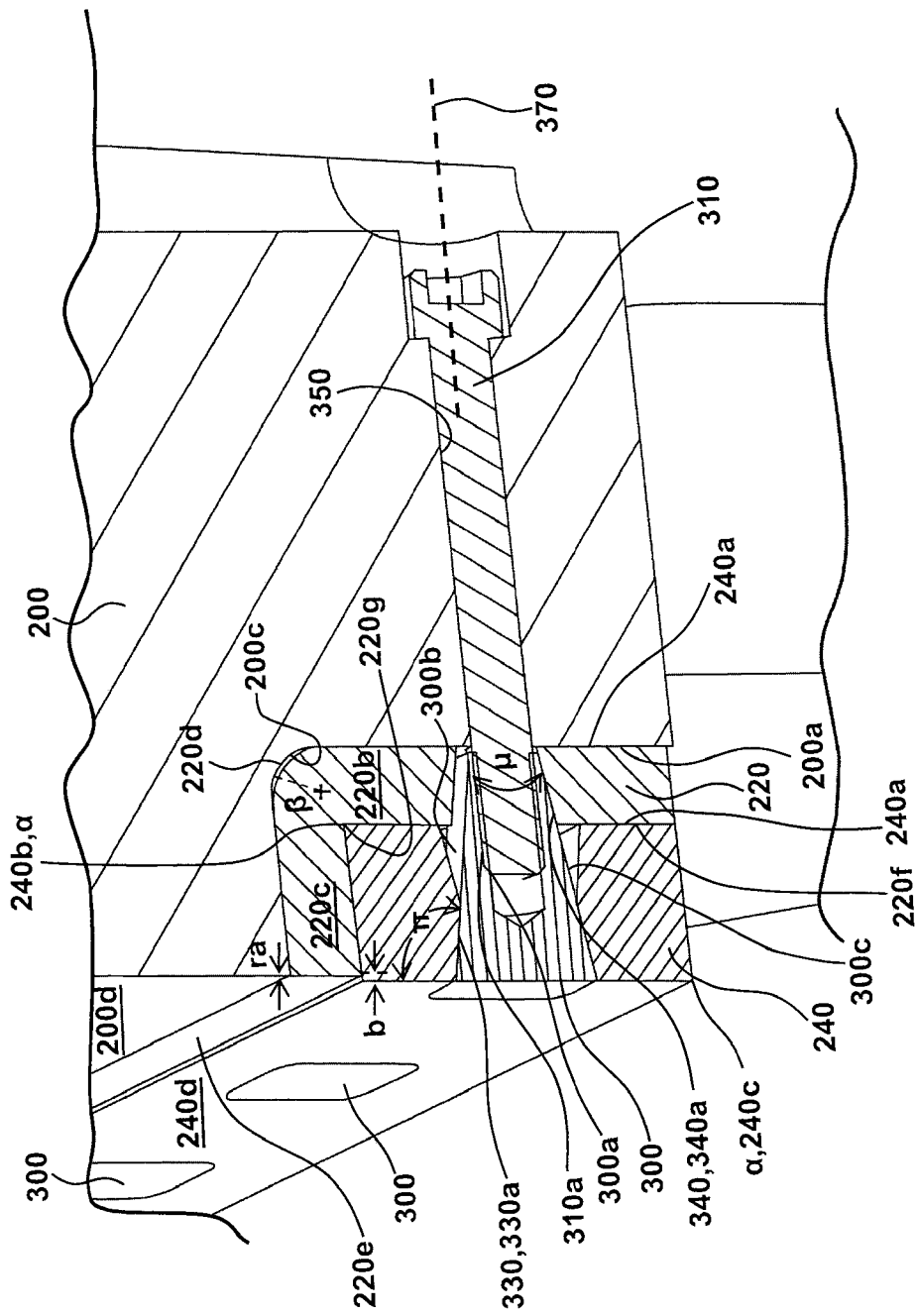
FIG. 6 is a partial cross-sectional view of the shears of FIG. 1, taken along the line 6-6 in FIG. 1.
Figure 21:
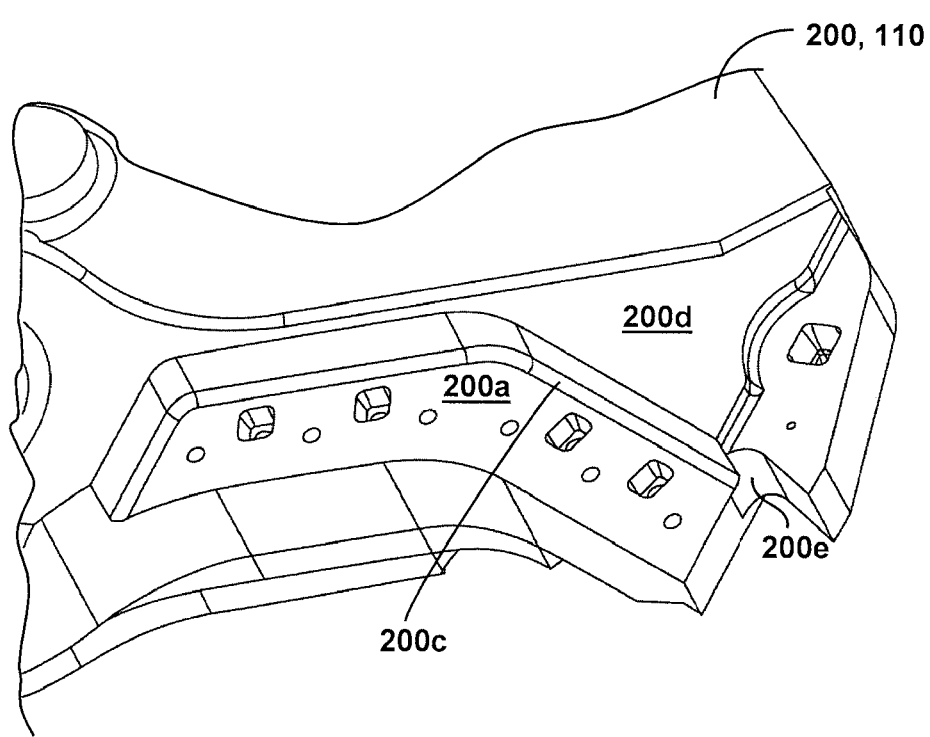
FIG. 21 is a partial perspective view of a main upper jaw body of the shears in FIG. 1.

As shown in FIG. 3 or 6, each blade holder 210, 220 includes a vertical segment 210b, 220b that is generally perpendicular to the pivot axis 145, and a horizontal segment 210c, 220c that is generally parallel to the pivot axis 145. The segments 210b, 220b and segments 210b, 220b, respectively, intersect each other at an angle to form a generally "L" or angular shaped cross-section. As shown in FIG. 3 or 6, an outside edge 210d, 220d is formed in the mounting surface 210a, 220a of the upper blade holders 210, 220 along the intersection between portions of the mounting surface 210a, 220a that extend along the vertical and horizontal segments (e.g., portions) 210b, 210c, 220b, 220c of the upper blade holders 210, 220. The edge 210d, 220d mates with a corresponding inside edge 200b, 200c in the main upper jaw body 200. The edges 210d, 220d, 200b, 200c are chamfered or rounded so as to reduce stress concentrations at the edges during operation of the shears 100. The rounded edge 200c is best illustrated in FIG. 21.

While the illustrated blade holders 210, 220 generally form an "L" shape (as viewed from a longitudinal end and/or in cross-section (e.g., as shown in FIG. 6)), any other suitable shape could alternatively be used (e.g., a flat shape, an "L" shape in which the arms of the "L" form an acute or obtuse angle, a "Z" shape in which the respective angles between the arms are acute, obtuse, and/or 90 degrees (e.g., as described in greater detail below with respect to the shears 1200)).

Figure 5:
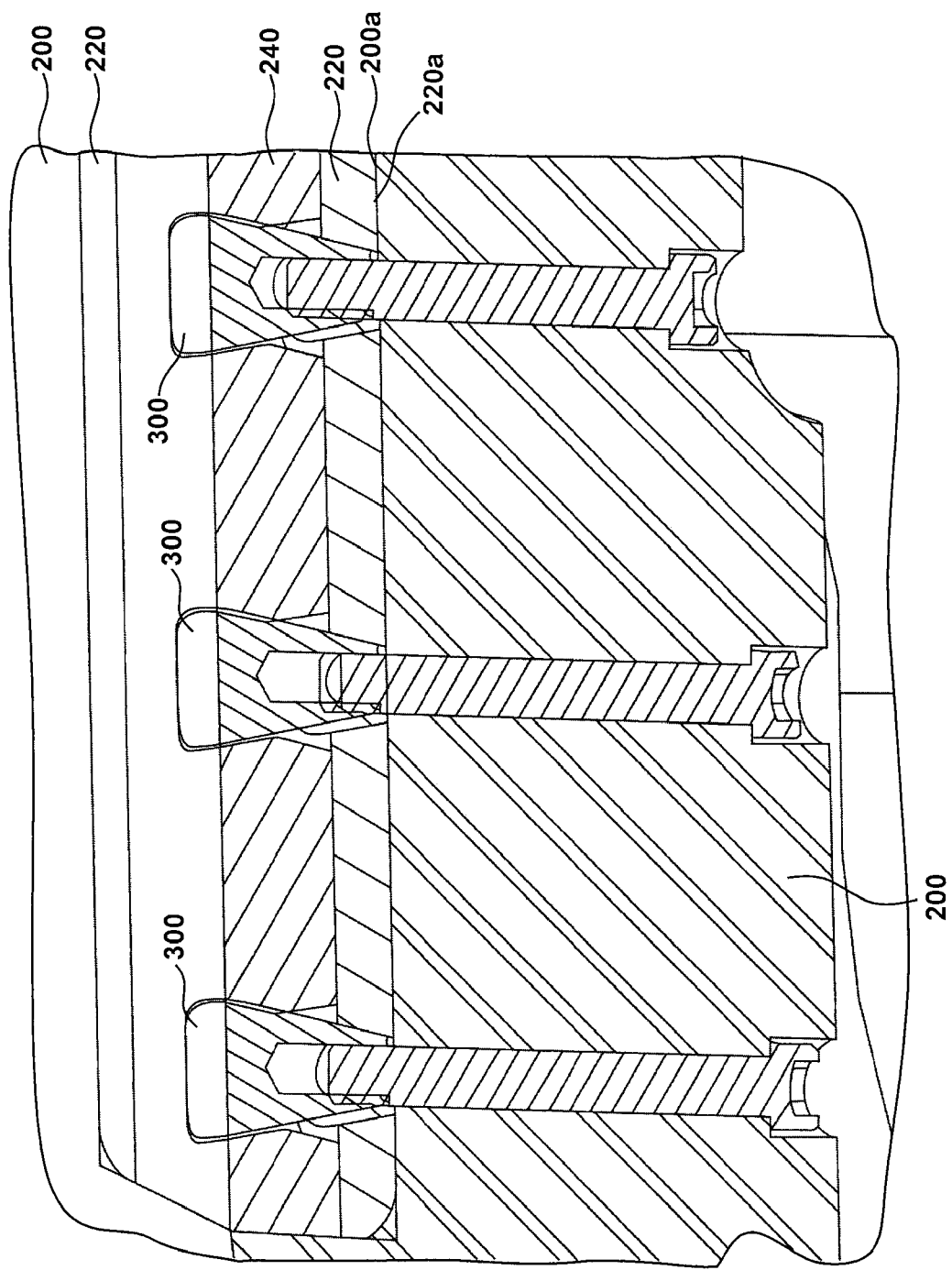
FIG. 5 is a partial cross-sectional view of the shears of FIG. 1, taken along the line 5-5 in FIG. 1.

As shown in FIG. 6, the upper jaw 110 includes detachable primary and secondary blades inserts 230, 240. As shown in FIGS. 3 and 5-6, the blade holders 210, 220 include "L" shaped blade insert seat surfaces 210f, 220f that mate with and abut corresponding "L" shaped mounting surfaces 230a, 240a of the blade inserts 230, 240, respectively. An outside edge 230b, 240b is formed in the mounting surfaces 230a, 240a along the intersection of the two sides of the "L" shape. The edges 230b, 240b mate with and abut corresponding edges 210g, 220g in the main upper jaw body 200.

According to various embodiments, the blade inserts 230, 240 are two- or four-way indexable such that the edges 230b, 240b define blade shearing edges that are in storage/non-used positions. As shown in FIG. 1, the blade inserts 230, 240 include exposed shearing edges 230c, 240c defined by exposed edges of the inserts 230, 240. The blade inserts 230, 240 may be indexed in the manner described in U.S. Pat. No. 5,992,023 (the entirety of which is incorporated herein by reference) so as to switch out a used/dull cutting edge 230c, 240c for a fresh (e.g., sharper or less dull) cutting edge 230b, 240b. According to various embodiments, the inserts 230, 240 are 4-way indexable relative to their initial blade holders 220, 230. According to alternative embodiments, 4-way indexability requires moving the blade insert 230, 240 to a different position on the shears (e.g., from primary to secondary position, from the upper jaw to the lower jaw, or vice-versa), ex described in U.S. Pat. No. 5,992,023.

As shown in FIG. 6, the abutting edges 200c, 220d (as well as edges 200b, 210d) between the blade holders 220, 210 and main upper jaw body 200 are more rounded, blunted, dull (less sharp), and/or chamfered than the abutting edges 240b, 220g (as well as edges 230b, 210g) between the blade holders 220, 210 and the blade inserts 230, 240. According to various non-limiting embodiments, the dull/blunted/rounded interfaces between the blade holders 210, 220 and the main upper jaw body 200 help to avoid stress concentrations along these edges. Conversely, according to various embodiments, the sharper interfaces between the blade inserts 230, 240 and the blade holders 210, 220 facilitate sharper cutting edges 240b, 240c, 230b, 230c, which helps to more effectively cut/shear workpieces when such edges 240b, 240c, 230b, 230c are in a working/exposed position, as is the case for the edges 230c, 240c shown in FIG. 1.

In one or more embodiments in which the edges 200c, 210d, 220d, 240b, 240c, 230b, 230c are rounded, a radius of curvature a (imperceptible in FIG. 6) of the blade inserts' edges 240b, 240c, 230b, 230c is smaller than a radius of curvature A of the mating edges 200c, 210d, 220d between the blade holders 210, 220 and the main upper jaw body 200. According to various embodiments, a ratio of β:α is (a) at least 2, 3, 4, 5, 6, 7, 8, 9, 10, 15, 20, 30, 40, and/or 100, (b) less than 1000, 500, 250, 100, 50, 25, and/or (c) between any two such upper or lower values.

According to various embodiments, the blade inserts 230, 240, 530, 540, 810 are manufactured from hardened materials (e.g., hardened steel, exotic materials), and may be cut from bar stock. According to various embodiments, the manufacture of the inserts 230, 240, 530, 540, 810 (1) does not rely on contact-based subtractive machining (e.g., metal-to-metal grinding, milling, drilling, turning, machining), and instead (2) involves only non-contact-based material removal (e.g., waterjet cutting, EDM) to form the ends of bar stock into the overall shape of the insert and to form the holes 330. According to various embodiments, none of the surfaces/holes of the inserts 230, 240, 530, 540, 810 are threaded, which can simplify manufacture, particularly where hardened materials are used and such threading would be more difficult. According to other embodiments, however, the inserts include threaded holes or other surfaces.

Hereinafter, a wedge block blade mounting system is described with reference to FIGS. 3 and 6. The blade insert 240 detachably mounts to the blade holder 220 and upper main jaw body 200 via a plurality of wedge blocks 300 and threaded fasteners 310 (e.g., nuts, bolts). As shown in FIG. 6, the wedge block 300 extends into a laterally-extending through hole 330 in the blade insert 240 and a laterally-extending hole 340 in the blade holder 220. The fastener 310 extends into a laterally extending through-hole 350 in the jaw body 200. An externally threaded portion 310a of the fastener 310 threadingly engages a mating internally threaded portion 300a of the wedge block 300. In the illustrated embodiment, the fastener 310 is a bolt 310, so the portion 310a is externally threaded, while the portion 300a is internally threaded. However, according to alternative embodiments, threaded fastener is a nut, such that the portion 310a is internally threaded and the portion 300a is externally threaded.

As shown in FIG. 6, the wedge block 300 has a wedge surface 300b that slidingly engages a wedge surface 330a formed by the hole 330 of the blade holder 220. The wedge block 300 also has a wedge surface 300c that slidingly engages a wedge surface 340a formed by the hole 340 of the blade insert 220. In the illustrated embodiment, all of the wedge surfaces 300b, 300c, 330a, 340a are angled/skewed (e.g., via acute angles) relative to a laterally-extending axis 370 of rotation and movement of the fastener 310. However, according to various alternative embodiments one or more of the wedge surfaces 300b, 300c, 330a, 340a (but preferably not all of them) can be parallel to the axis 370. According to various embodiments, the axes 145, 370 are parallel to each other.

In the illustrated embodiment, the wedge surfaces 330a, 340a are formed by holes 330, 340. However, according to alternative embodiments, the wedge surfaces 330a, 340a may be formed by other parts of their respective structures (e.g., side surfaces, receptacles, slots, etc.) without deviating from the scope of the invention.

When the fastener 310 is tightened, it draws the wedge block 300 laterally toward the fastener 310 along the longitudinal/rotational axis of the fastener 310, which directly draws both the blade insert 240 and the blade holder 220 laterally toward the upper jaw body 200 along a laterally-extending force-applying direction (i.e., along the longitudinal/rotational axis of the fasteners 310). This causes the vertically extending portions of the seat surfaces 220f, 240a and 200a, 220a to tightly seat against each other. This tightening also causes the wedge surfaces 300b, 300c, 330a, 340a to push the blade insert 240 upwardly relative to the blade holder 220, which causes the upper horizontally-extending portions of the seat surfaces 220f, 240a to tightly seat against each other in a vertical direction that is angled relative to (e.g., perpendicular to) the lateral, direct seat force direction of the fastener 310. Thus, according to various embodiments, components of the resulting force exerted on the insert 240 by the wedge block 300 extend in directions parallel and perpendicular to the longitudinal/rotational axis of the fastener 310 (i.e., the laterally-extending force-applying direction of the fastener 310). The slight angles of one or more of the wedge surfaces 300b, 300c, 330a, 340a causes the lateral seating force of the fastener 310 to be amplified in this vertical component direction so that a vertical seating force between the blade insert 240 and blade holder 220 is significantly larger than the lateral direct seating force. According to various embodiments, a ratio of the vertical seating force to the lateral seating force is (a) at least 1.5:1, 2:1, 3:1, 4:1, 5:1, 6:1 and/or 10:1, (b) less than 100:1, 50:1, 40:1, 30:1, 20:1, and/or 10:1, and/or (c) between any two such ratios. As a result, the wedge block 300 tightly seats the mounting surface 240a of the blade holder 240 against the seat surface 220f of the blade holder 220, both in the lateral/horizontal direction and the vertical direction. According to various non-limiting embodiments, use of the wedge block 300 and its force-amplification reduces a required tightening torque/force for the fasteners 310 to secure the blade inserts to the jaws.

As shown in FIG. 6, according to various embodiments, the wedge surfaces 300b, 300c form a non-zero angle μ with each other. If the wedge surface(s) 300b are curved (e.g., if the cross-sectional shape of the wedge block 300 is oval-shaped in a plane that is perpendicular to the axis 370 when the fastener 310 is threaded into the wedge block 300 as shown in FIG. 6), then the angle μ is measured in any plane that includes the central axis of the threaded hole 300a (which is collinear with the axis 370 of rotation of the attached mating fastener 310). According to various embodiments, the angle μ is (a) at least 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and/or 40 degrees, (b) less than 90, 80, 70, 60, 50, 40, 35, 30, 25, and/or 20 degrees, and/or (c) between any two such values. As the angle μ decreases, the ratio of the vertical seating force to the lateral seating force increases. Accordingly, the angle μ can be tailored to provide the desired combination of vertical and horizontal seating forces.

As shown in FIG. 6, each through hole 330 extends from one lateral surface 240d of the insert 240 through to an opposite lateral surface 240a. According to various embodiments, the surfaces 240a, 240d are planar, parallel, and configured to be perpendicular to the axis 370. According to various embodiments, each wedge surface 300b, 300c, 330a, 340a forms an angle with the axis 370 that is ½ μ. For example, as shown in FIG. 6, the surface 330a forms an angle π with the surfaces 240a, 240d that deviates from a right angle (90 degrees) by ½ μ. The angle π will be obtuse or acute, depending on whether (1) it is measured through the material of the insert 240, and (2) it is measured relative to the surface 240a or 240d. As shown in FIG. 6, the angle π is being measured through the material of the insert 240 and relative to the surface 240d immediately adjacent to the surface 330a, so the angle π is obtuse. According to various embodiments, the angle π deviates from 90 degrees by (a) at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, and/or 35 degrees, (b) less than 50, 40, 35, 30, 29, 28, 27, 26, 25, 24, 23, 22, 21, 20, 19, 18, 17, 16, 15, 14, 13, 12, 11, 10, 9, 8, 7, 6, and/or 5 degrees, and/or (c) between any two such values (e.g., between 1 and 35 degrees, between 5 and 30 degrees, between 5 and 25 degrees, between 5 and 20 degrees, between 5 and 15 degrees).

In a cross-section of the insert 240 that is taken in a plane that is perpendicular to the axis 370 (which represents an axis of the hole 330) and/or parallel to the surface 240a or 240d, a perimeter of the hole 330 is rectangular. The rectangular perimeter may have angled corners, convexly rounded corners (as shown), concavely depressed corners (e.g., forming an octagon shape in which every other side is concave), chamfered corners, etc. Alternatively, the perimeter of the hole 330 may be any other suitable shape (e.g., "D" shaped, oval-shaped, circular). As shown in FIG. 6, the rectangular shape may have corners that are curved, chamfered, rounded, or otherwise not exactly pointed while still being rectangular. According to various embodiments, the rectangular shape is square shaped. A square shaped perimeter may facilitate the use of a correspondingly shaped square wedge block 300 that may be inserted into the hole 330 in any of 4 rotational positions (each offset by 90 degrees from an adjacent rotational position). As a result, the hole 330 may have the general shape of two topless/truncated, rectangular (e.g., square) pyramids (i.e., rectangular pyramidal frustums) that each taper inwardly as they progress from their respective surfaces 240d, 240a toward a middle of the hole 330 where the meet each other.

A cross-sectional shape of the wedge block 300 (i.e., taken in a plane that is perpendicular to the central axis of the block 300 (e.g., in a plane that is perpendicular to an axis of the threaded hole 300a)), the wedge block 300 may have the same shape as the perimeter of the mating hole 330. Thus, the above-descriptions of the shape of the hole 330 applies equally to the shape of the wedge block 300 according to various embodiments.

Figure 33:
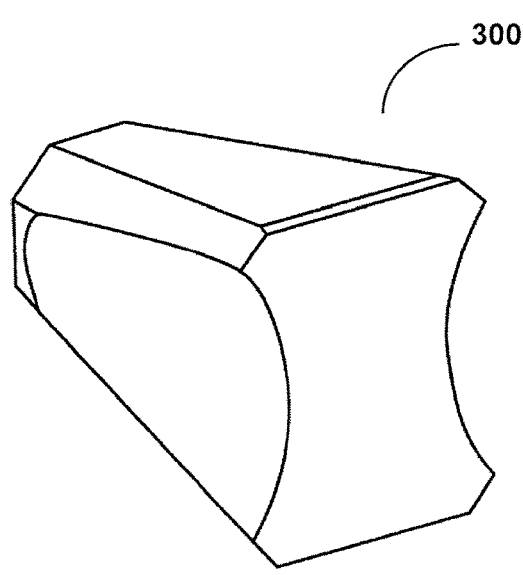
FIGS. 33-35 illustrate alternative wedge blocks that may be used in connection with shears described herein.
Figure 34:
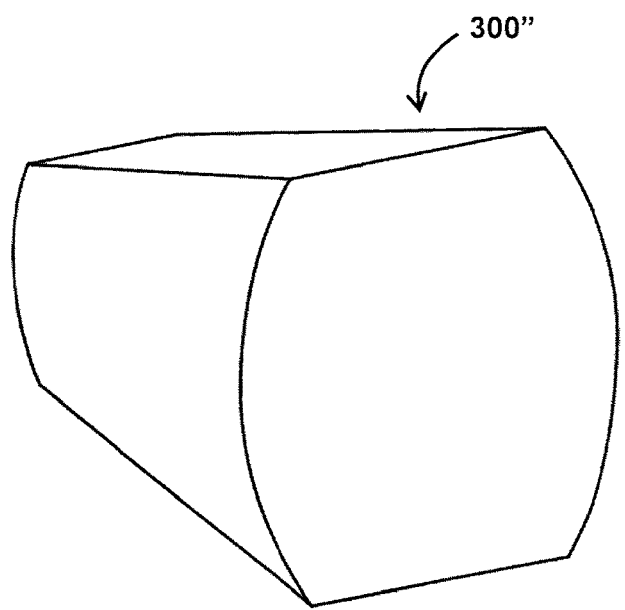
Figure 35:
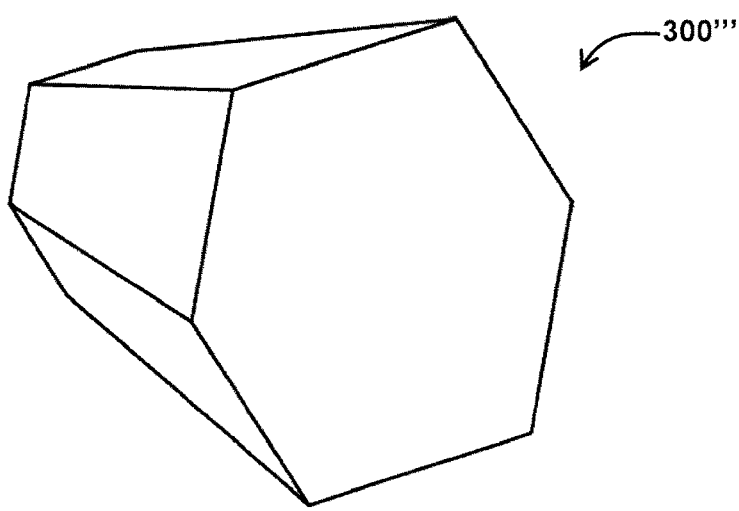

FIGS. 33-35 illustrate alternative wedge blocks 300', 300'', 300''' that may replace the above-described wedge block 300. As shown in FIG. 33, the wedge block 300' is similar to the wedge block 300, except that a partial conic shape is removed from two opposing sides (as compared to the wedge block 300). As shown in FIG. 34, the wedge block 300'' is similar to the wedge block 300, except that two of the opposing sides are bowed/convex. Alternatively, opposing sides could be concave (e.g., as shown in FIG. 33), or some sides could be convex while other sides are concave. FIG. 35 illustrates an alternative wedge block 300''' that forms a truncated hexagonal pyramid shape (e.g., to provide 6-way indexability). Alternatively, the wedge block may form a regular, simple, equiangular polygon with integer n sides (where 2<n<50) (e.g., a triangle, a pentagon, an octagon, a septagon, an octagon, a nonagon, a decagon), that is n-way indexable. According to various embodiments, relative to the embodiment illustrated in FIG. 6, the mating hole 330 in the insert 240 and mating hole 340 in the blade holder 220 would be commensurately shaped to match that of the wedge block (e.g., the wedge blocks 300, 300', 300", 300''' or any of the above-discussed alternative wedge blocks).

According to various embodiments, the cross-sectional shape of the wedge block 300 and the mating hole 330 in the insert 240 and/or mating hole 340 I the blade holder 220 are non-circular so that the wedge block 300 is discouraged from spinning when the mating threaded fastener 310 is threaded into or out of the threaded hole 300a of the wedge block 300.

According to various alternative embodiments, the wedge block 300 may have any shape that provides first and second wedge surfaces (flat or curved) on opposite sides of the wedge block 300, respectively and the mating hole 330 in the insert 240 and hole 340 in the blade holder 220 would each have a surface that matches and mates with the first and second wedge surfaces, respectively.

According to embodiments that are not indexable by switching the relative positions of the surfaces 240d and 240a, the hole 330 may have the general shape of a single topless/truncated, rectangular (e.g., square) pyramid (i.e., pyramidal frustum). Such embodiments may be 2-way indexable by rotating the insert 240 180 degrees in a plane of the surface 240d.

According to various embodiments, two opposing side surfaces of the rectangular pyramidal frustum shape of the hole 330 are tapered because they form wedge surfaces. However, the other two side surfaces can deviate from the pyramid shape, for example if they are not used as wedge surfaces. In such embodiments, the those non-wedge side surfaces of the hole 330 may be parallel to the axis 370/perpendicular to the surface 240d (i.e., not tapered/skewed). In such alternative embodiments, the perimeter of the hole 330, as seen in a cross-section taken parallel to the surface 240d (i.e., perpendicular to the axis 370), may remain rectangular.

The above description of the wedge surface 330a of the insert 240 should be understood to apply equally to the three additional wedge surfaces that are formed by the hole 330 (and other similar holes in the inserts) to accommodate 4 way indexability of the insert 240, as shown in FIG. 6.

According to various embodiments, the inserts may be 8-way indexable, for example if the insert is square or diamond-shaped.

According to various embodiments, the wedge surface 300b, 300c, 330a, 340a are planar and their edges curve smoothly into other surfaces. According to various alternative embodiments, the wedge surface 300b, 300c, 330a, 340a are curved, but are not rotationally symmetric relative to the axis 370. Thus, the wedge surface 300b, 300c, 330a, 340a discourage or prevent the wedge block 300 from rotating relative to the insert 240 if the surfaces 300b, 330a are seated against each other.

In the illustrated embodiment, three wedge blocks 300 are used to detachably mount the blade insert 240 to the blade holder 220 and/or jaw 110. However, greater or fewer wedge blocks 300 could alternatively be used without deviating from the present invention. For example, additional spaced wedge blocks 300 could be used for a longer blade insert 240.

In the illustrated embodiment, one fastener 310 is used for each wedge block 300. However, according to alternative embodiments, multiple fasteners 310 and associated holes 300a are used for each wedge block (e.g., for wedge blocks that are elongated (e.g., rectangular as viewed from the lateral side of the shears 100) rather than generally square, as is the case for the illustrated wedge-blocks 300.

Figure 15:
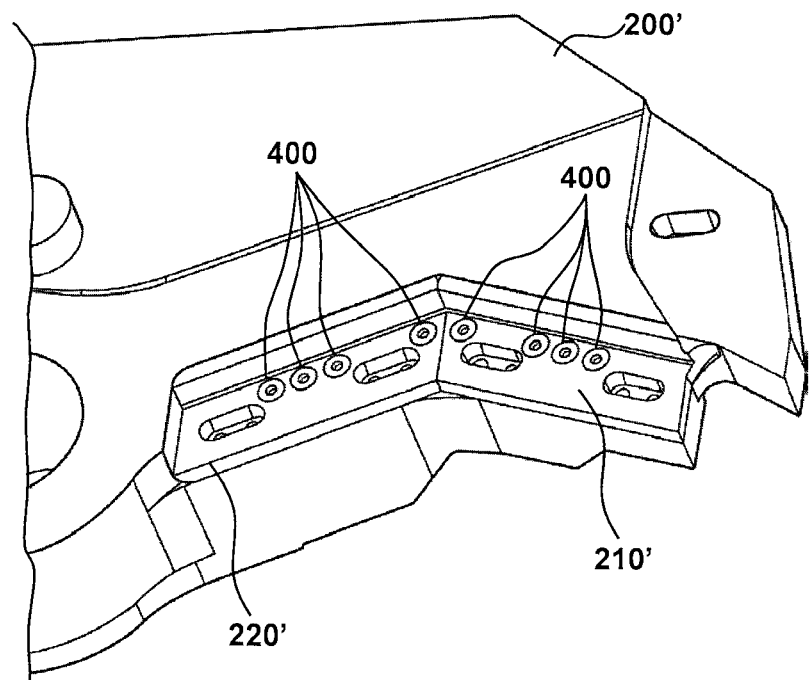
FIG. 15 is a partial right-side perspective view of an upper jaw of a shears according to an alternative embodiment.
Figure 16:
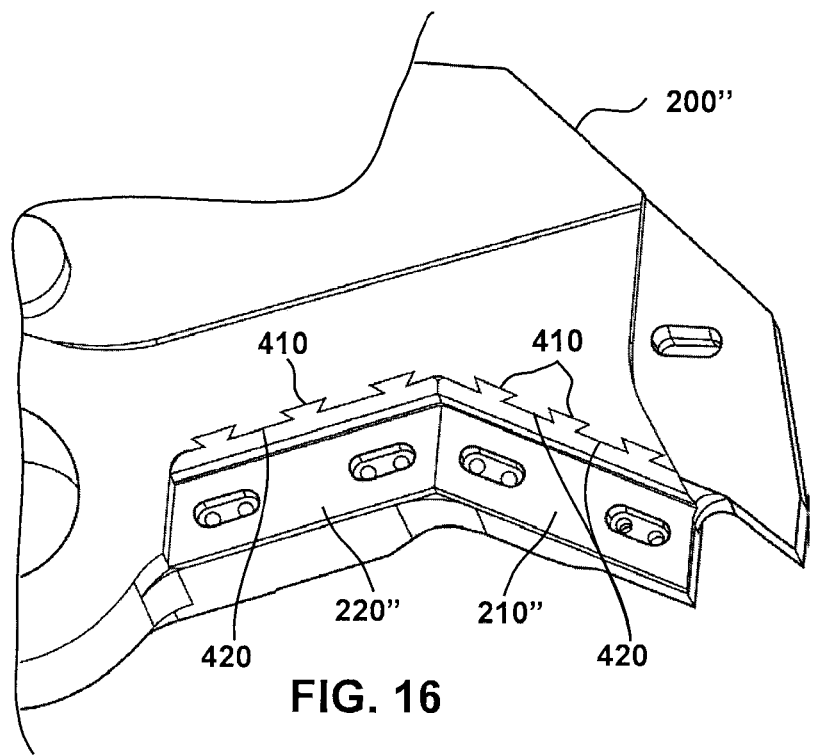
FIG. 16 is a partial right-side perspective view of an upper jaw of a shears according to an alternative embodiment.
Figures 17, 18:
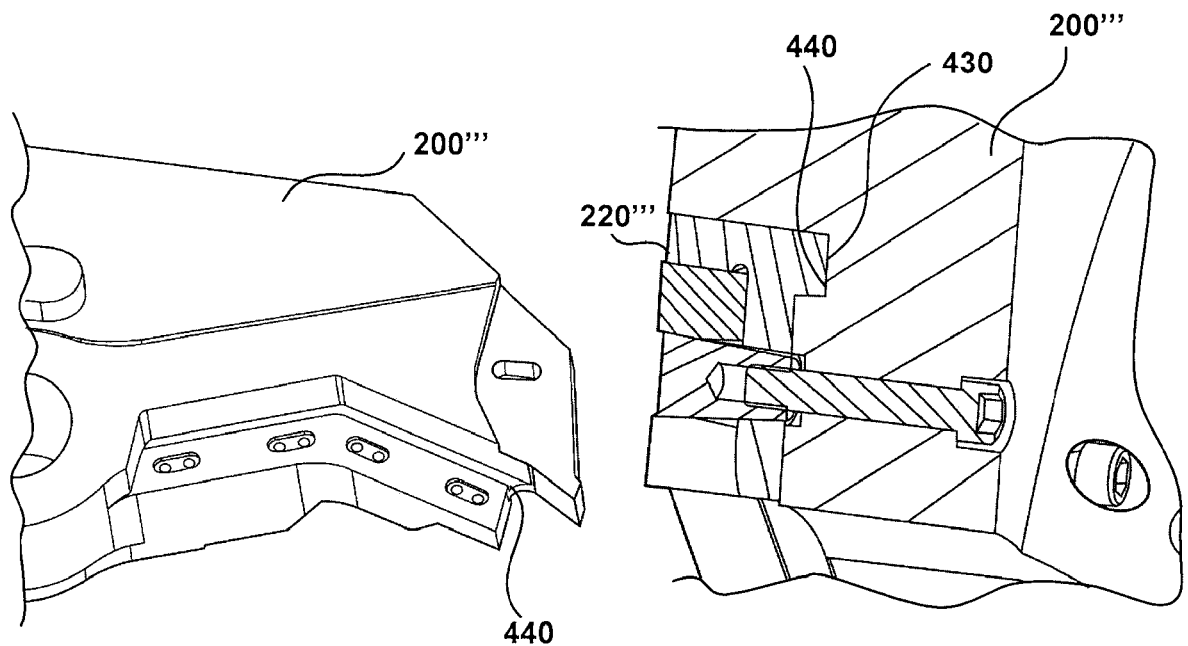
FIG. 17 is a partial right-side perspective view of an upper jaw of a shears according to an alternative embodiment.
FIG. 18 is a cross-sectional view of the upper jaw of the shears of FIG. 17.
Figure 19:
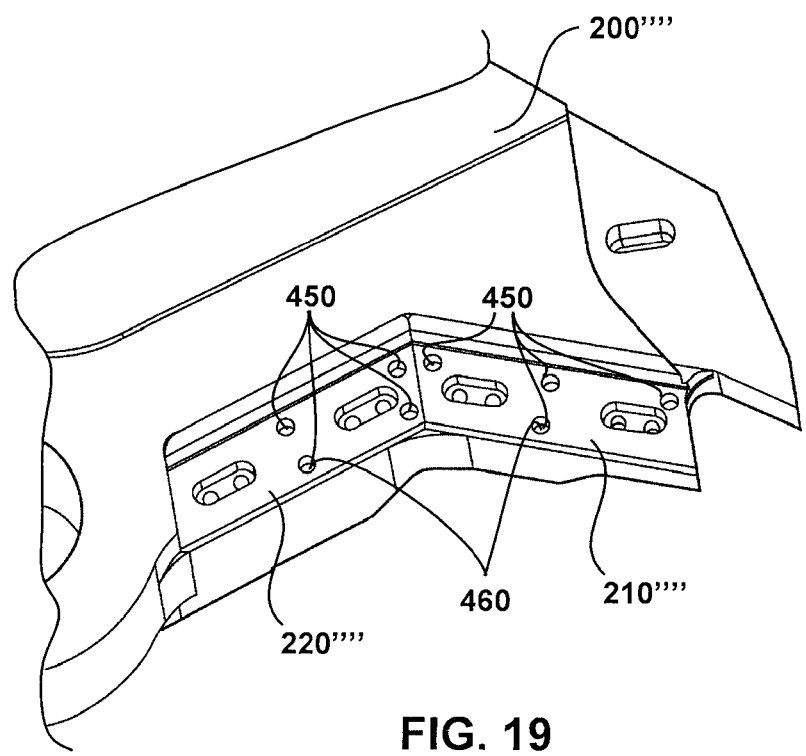
FIG. 19 is a partial right-side perspective view of an upper jaw of a shears according to an alternative embodiment.

In the illustrated embodiment, in addition to mounting the blade insert 240 to the blade holder 220, the wedge blocks 300 and fasteners 310 detachably mount the blade holder 220 to the upper main body 200. However, according to alternative embodiments, the blade holder 220 may detachably mount to the upper main body 200 separately from the blade insert 240. For example, additional wedge blocks and fasteners that are similar or identical to the wedge blocks 300 and fasteners 310 may be used to firmly seat the blade holder 220 against the upper main body 200 in the same manner as the above-discussed wedge blocks 300 and fasteners 310 firmly seat the blade insert 240 against the blade holder 220. Alternatively, as shown in FIG. 15, the blade holders 220', 210' may be directly bolted to an upper main body 200' via bolts 400. Alternatively, as shown in FIG. 16, the blade holders 220", 210" and jaw body 200" may include mating dovetailed projections 410, 420 that facilitate a secure vertical and front/back connection between them. Alternatively, as shown in FIGS. 17-18, the blade holders 220''' and 210''' may include lateral projections 430 that extend into mating grooves 440 in the upper main body 200''' to facilitate a secure vertical connection between them. Alternatively, as shown in FIGS. 17-18, the main upper jaw body 200" " may include laterally extending bosses 450 (e.g., dowels) that extend into mating holes 460 in the blade holders 220" " and 210" " to facilitate a secure vertical and front/back connection between them. Alternatively, the relative positioning of the above-discussed mating components (e.g., groove 440 and projection 430; dowels/bosses 450 and holes 460) may be reversed. Additionally and/or alternatively, the blade holder 220 may be welded to the main body 200. The blade holders 220 are wear parts, so the weldments can be broken in order to replace the blade holder 240.

In the embodiment illustrated in FIGS. 1-8, the blade holders 210, 220, 510, 520 are disposed between the respective blade inserts 230, 240, 530, 540 and their respective jaws 110, 120. However, according to various alternative embodiments, the blade holders are eliminated such that the blade inserts seat directly against mounting surfaces of the respective main jaw bodies 200, 550. Such alternative embodiments could be identical to the shears 100, except that the main upper jaw body 200 and one or more of the upper blade holders 210, 220 are integrally formed (e.g., by common casting, forging, machining from a single piece of metal). In such embodiments, the wedge blocks 300 could act directly between the blade inserts and the remainder of the upper jaw (e.g., a combined body that includes both the illustrated body 200 and the blade holders 210, 220) so as to securely attach the blade inserts to the jaw body 200 in the same manner as the blade inserts 230, 240 are securely attached to the blade holders 210, 220 in the embodiment illustrated in FIGS. 1-8.

In the embodiment illustrated in FIGS. 1-8, the wedge blocks 300 are physically separate components from the blade inserts 230, 240, 530, 540. However, according to alternative embodiments, one or more of the wedge blocks 300 may be rigidly connected to or integrally formed with their respective blade inserts 230, 240, 530, 540. For example, with reference to FIG. 6, one, two, or three wedge blocks 300 and the insert 240 may comprise a single rigid body that is formed via, for example, common casting, common forging, common additive and/or subtractive machining, welding of previously discrete wedge block(s) 300 to the previously discrete blade insert 240, etc. As a result, the single rigid body would comprise a blade insert portion with one or more tapered/wedge block portions protruding out of a side thereof. The single rigid body of the combined wedge block(s) and blade insert could mount to the shears in the same manner as described above with respect to the discrete wedge blocks 300 and blade inserts 230, 240, 530, 540. Such a single rigid body may be two-way indexable (e.g., by rotating the common body 180 degrees in the plane of the surface 240a or 240d).

In the same manner, for embodiments in which separate wedge blocks are used to mount the blade holders to the underlying jaw, wedge blocks could be rigidly connected to or integrally formed with the blade holders to facilitate mounting the blade holders to the underlying jaws.

The above written description specifically describes the structure of the upper blade inserts 230, 240 and upper blade holders 210, 220. As shown in FIGS. 1-4, it should be understood that corresponding lower primary and secondary blade inserts 530, 540 and lower primary and secondary blade holders 510, 520 are similar or identical to their upper jaw counterparts and similarly or identically mounted to each other and their respective jaw body 550. Accordingly, a redundant description of this similar or identical structure is omitted. Indeed, according to various embodiments, two or more of the blade inserts 230, 240, 530, 540 may be identical to each other to facilitate four-way indexability (including by moving an insert from an upper jaw to a lower jaw and vice-versa to facilitate positioning the third and fourth cutting edges in working/exposed positions). Thus, the lower primary and secondary blade inserts 530, 540 and lower primary and secondary blade holders 510, 520 may mount to a lower main jaw body 550 of the lower jaw 120.

According to various embodiments, one or more shims may be placed between any of the blade insert(s) and blade holder(s) and/or between any of the blade holder(s) and underlying jaw(s) to adjust the lateral and/or vertical position of the insert(s) and/or blade holder(s) relative to the underlying jaw body, without having to modify the dimensions of the insert and/or blade holder being repositioned. Such shims may be used, for example, to adjust the cutting blade gaps between mating cutting blade inserts on the upper and lower jaw.

The above written description specifically describes the structural and functional interconnections between the blade insert 240, blade holder 220, and/or upper main body 200. It should be understood that similar or identical structures and interconnections may also be used to interconnect any of the other blade inserts 230, 530, 540, their respective blade holders 210, 510, 520, and/or their respective jaw bodies 200, 550. As a result the above written description applies equally to those other connections between those other blade inserts, blade holders, and/or jaws.

Figure 4:
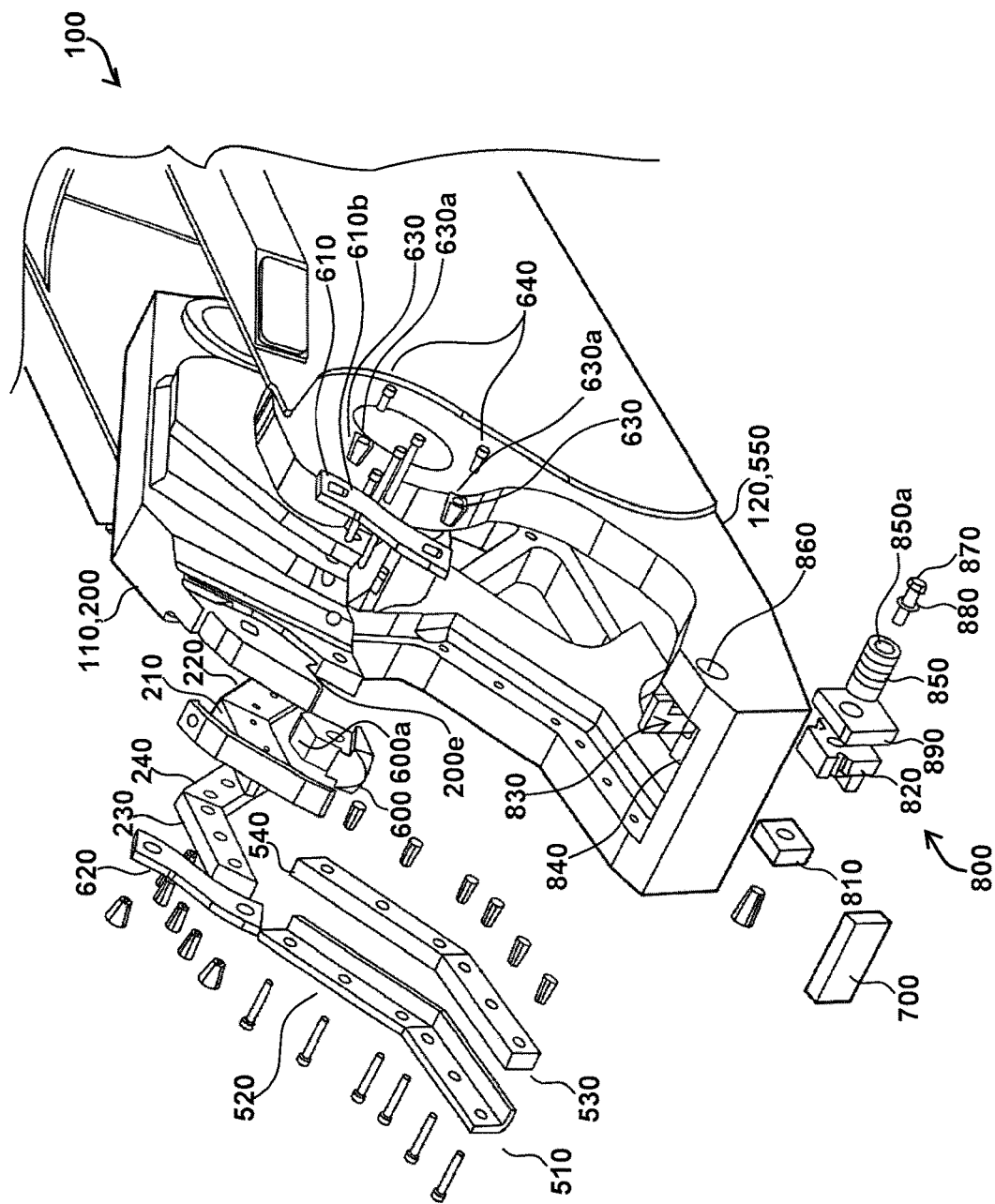

As shown in FIGS. 1-4 and 7-8, the upper jaw 110 includes a replaceable, detachable piercing tip 600. As shown in FIGS. 3-4, the tip 60 includes an upward bulging projection that defines a mounting surface 600a. The surface 600a mates with an abuts a correspondingly shaped seat surface 200e of the main upper jaw body 200. The mating contours of the surfaces 600a, 200e are non-planar so as to help facilitate a better structural connection therebetween.

The piercing tip 600 is mounted to the main upper jaw body 200 via left and right lateral support plates 610, 620. The right lateral support plate 620 mounts to the main upper jaw body 200 via a wedge block 300 in the same manner as wedge blocks 300 are used to mount the blade inserts to the blade holders, as explained above. The right lateral support plate 620 mounts to the piercing tip 600 via a wedge block 300 in the same manner.

Figure 20:
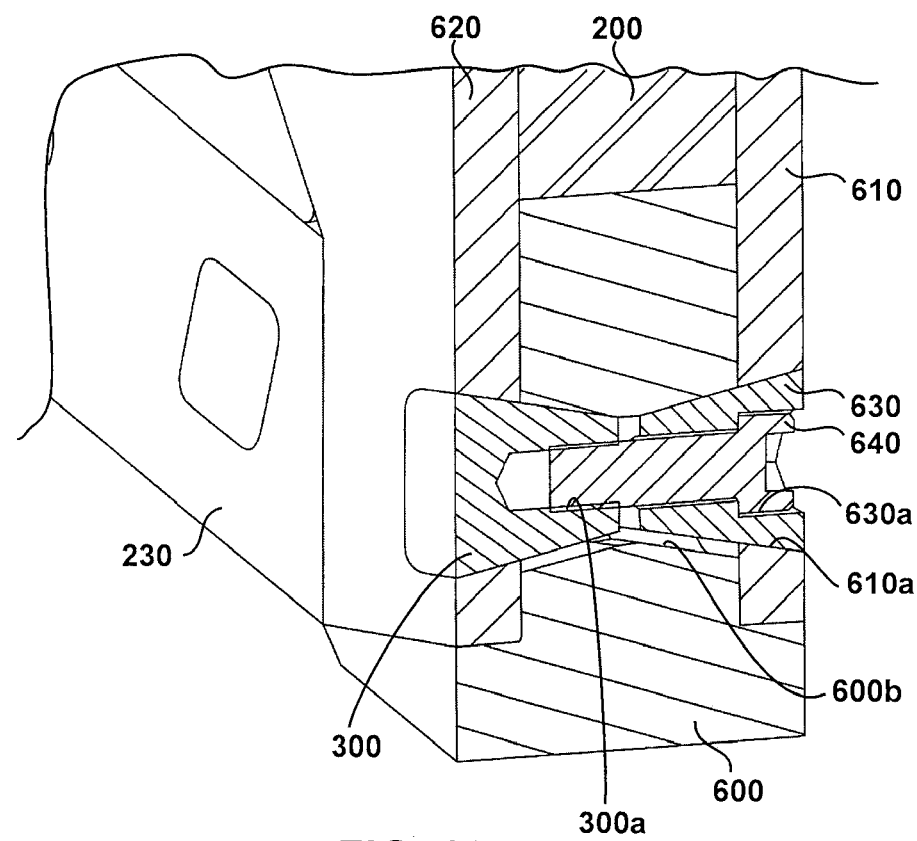
FIG. 20 is a partially-cutaway view of the nose portion of the upper jaw of the shears of FIG. 1, taken along the line 20-20 in FIG. 1.

As shown in FIGS. 2, 3, 4, and 20, the left lateral support plate 610 mounts to the main upper jaw body 200 and piercing tip 600 via respective wedge blocks 630. As best illustrated in FIG. 20, the wedge blocks 630 are functionally identical to the above-discussed wedge blocks 300, except that the wedge blocks 630 include non-threaded, laterally extending, recessed-shoulder holes 630a, rather than the threaded holes 300a of the wedge blocks 300. As shown in FIG. 20, a lower bolt 640 extends sequentially through the shouldered hole 630a in a lower wedge block 630, a lower hole 610a in the left lateral support 610, a lateral through hole 600b in the piercing tip 600, and into threaded engagement with the threaded hole 300a of the wedge block 300. Similarly, as shown in FIG. 3, an upper bolt 640 extends sequentially through the shouldered hole 630a in an upper wedge block 630, an upper hole 610a in the left lateral support 610, a lateral through hole 200f in the upper main body 200, and into threaded engagement with the threaded hole 300a of an upper wedge block 300. The wedge surfaces of the wedge blocks 300, 630, holes 610a, 620a in the lateral support plates 610, 620, and holes 600b, 200f are structured in the same manner as described above in connection with the use of wedge blocks 300 to securely mount the blade inserts 230, 240 to the blade holders 210, 220. In particular, the wedge surfaces of the wedge blocks 300, 630, holes 610a, 620a in the lateral support plates 610, 620, and holes 600b, 200f are oriented and sloped so as to securely draw the mounting surface 600a of the piercing tip 600 toward and into secure engagement with the mating recessed seat surface 200e of the main upper jaw body 200.

Figure 8:
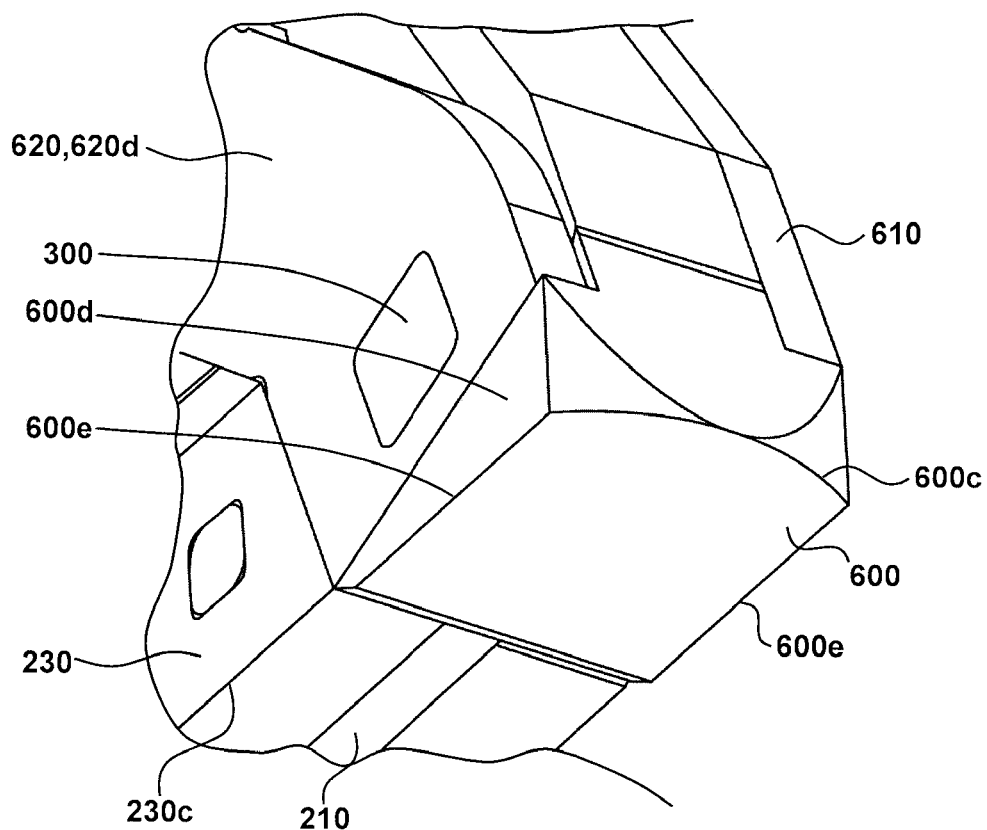

As shown in FIGS. 1-2, outer exposed lateral surfaces 610b, 620b of the lateral support plates 610, 620 define guide/wear surfaces that slidingly engage a lateral surface 810b of a guide blade 810 (discussed below; see FIGS. 13-14) and the lower primary blade 530 during shearing motion of the shears 100 and stand out from adjacent lateral surfaces of the upper main jaw body 200. The lateral support plates 610, 620 may be replaced when worn, and protect the upper main jaw body 200. As shown in FIG. 8, the lateral support plates 610, 620 mate with side notches in the piercing tip 600 such that the lateral surfaces 610b, 620b extend smoothly from lateral surfaces 600d of the piercing tip 600 to form overall side/lateral wear/sliding surfaces of the upper jaw 110.

Figure 7:
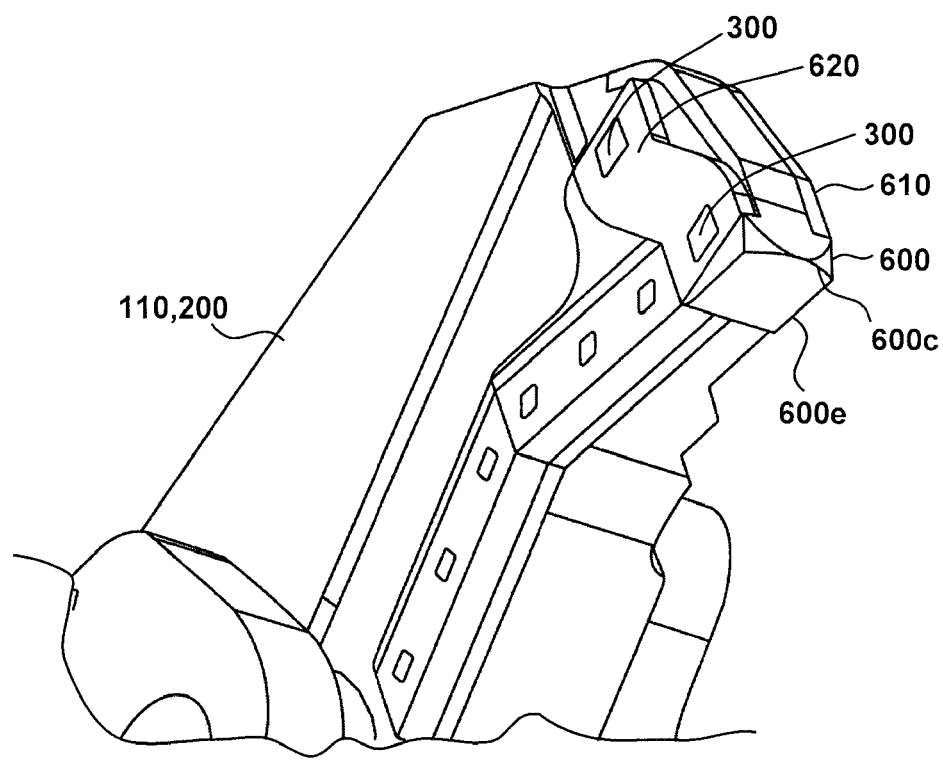
FIGS. 7-8 are a partial front perspective views of an upper jaw of the shears of FIG. 1.

As shown in FIGS. 7-8, a front piercing/cutting edge 600c of the piercing tip 600 bulges forwardly/outwardly and downwardly toward a front of the lower jaw 200. As a result, when the shears 100 are used to shear a plate-shaped workpiece, a front, central portion of the edge 600c contacts the workpiece first, which focuses the piercing force of the shears 100 at that localized forward contact between the cutting edge 600c and the workpiece, which tends to improve the ability of various non-limiting embodiments of the shears 100 to pierce plate-shaped workpieces. As the piercing motion continues, locations of cutting (including shearing) contact between the cutting edge c and workpiece laterally spread out until they reach the side cutting/shearing edges 600e of the piercing tip 600 (see FIG. 8). The location of shearing contact flows from the right cutting edge 600d back to the exposed cutting/shearing edge 230c of the blade insert 230, and then to the cutting edge 240c of the blade insert 240 (see FIG. 1).

In the embodiment illustrated in FIGS. 7-8, the bulge of the cutting edge 600c is round and/or convex and laterally centralized. According to various embodiments, the bulge may have a constant or varying radius. The cutting edge 600c may fall entirely within a single plane, or may be 3-dimensional. According to alternative embodiments, the bulge comprises a combination of curves and/or angle(s) (e.g., spade shaped, triangle shaped, etc.).

As shown in FIGS. 1-3, a front nose cover 650 bolts to the front of the main upper jaw body 200 to protect a front surface of the main upper jaw body 200 from wear during operation of the shears 100. The cover 650 can be replaced when worn.

FIGS. 9-12 illustrate a variety of alternative piercing tips 660, 670, 680 that may be used with the shears 100 in place of the above-discuss piercing tip 600. Except as discussed below, these alternative tips 660, 670, 680 may be similar or identical to the piercing tip 600.

Figure 9:
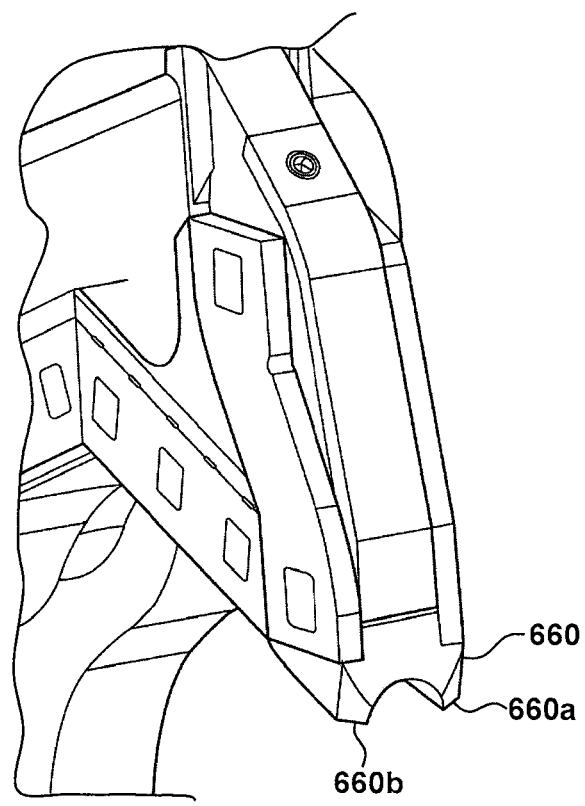
FIGS. 9-10 are partial perspective views of a shears according to an embodiment with a fang-toothed piercing tip.
Figure 10:
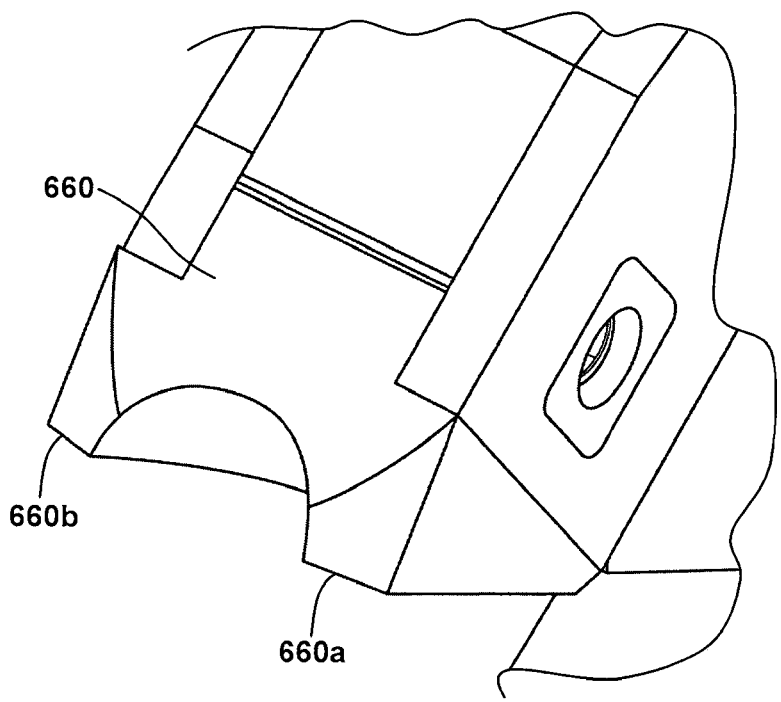

As shown in FIGS. 9-10, the piercing tip 660 includes two laterally-spaced downward projections 660a, 660b. When the shears 100 pierce a plate-shaped workpiece, these fang-like projections 660a, 660b cause the shears to initially contact and pierce the workpiece at two laterally-spaced locations, which focus the piercing force of the shears 100 at those two places.

Figure 11:
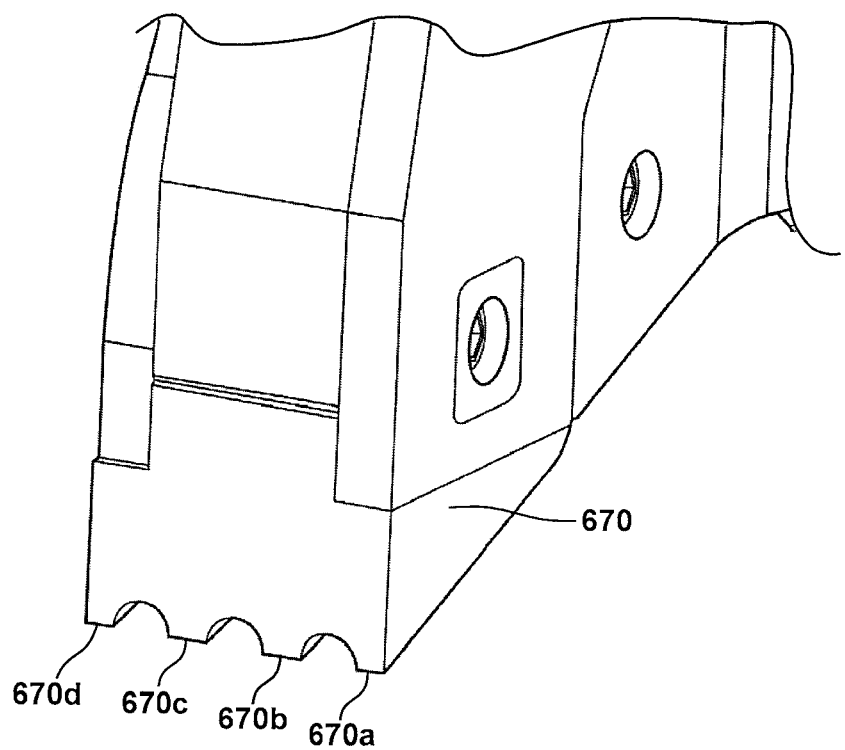
FIG. 11 is a partial perspective view of a shears according to an alternative embodiment with a laterally toothed piercing tip.

As shown in FIG. 11, the piercing tip 670 is similar to the piercing tip 660, except for including four individual, laterally-spaced, downward projections 670a, 670b, 670c, 670d, rather than just two. When the shears 100 pierce a plate-shaped workpiece, these rake-like projections 670a, 670b, 670c, 670d initially contact and pierce the workpiece at four laterally-spaced locations, which focus the piercing force of the shears 100 at those four places.

Figure 12:
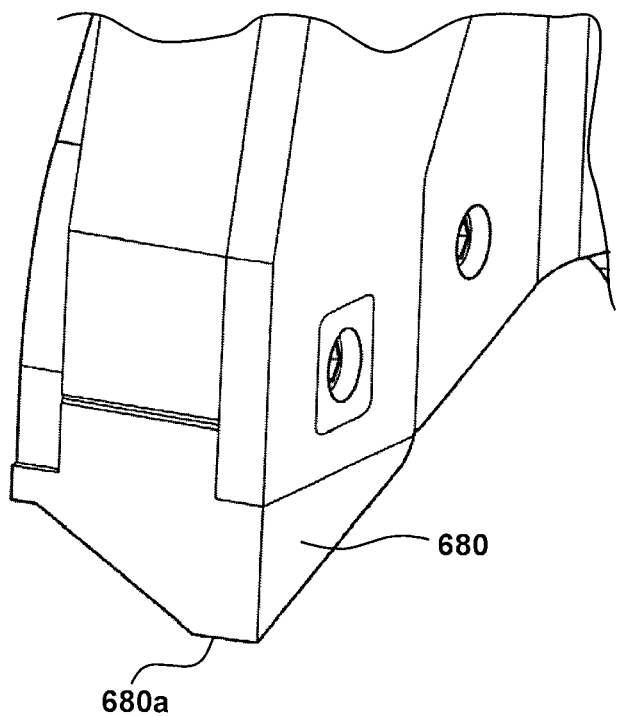
FIG. 12 is a partial perspective view of a shears according to an alternative embodiment with laterally-offset, skewed, piercing tip.

As shown in FIG. 12, the piercing tip 680 is similar to the piercing tip 600, except that the singular bulge of the piercing edge 680a of the tip 680 is laterally offset toward a left side of the tip 680, jaw 110, and shears 100 (as opposed to the laterally centered bulge of the edge 600c of the tip 600). When the shears 100 pierce a plate-shaped workpiece, this lateral offset causes a left lateral portion of the edge 680 (the right side as shown in FIG. 12) to contact and first pierce the workpiece. The location of shearing/cutting/piercing contact between the upper jaw 110 and the workpiece then progresses rightwardly along the edge 680a (to the left as shown in FIG. 12) and then along the longitudinal cutting edges of the upper jaw 110.

As shown in FIGS. 2-4 and 13, a cross member 700 of the lower jaw 120 detachably mounts to a front inside portion of the lower main jaw body 550 (e.g., via bolts, wedge blocks 300, etc.). The cross member 700 has a cutting/shearing edge 700a that loosely mates with the cutting edge 600c of the piercing tip 600. According to various embodiments, the edge 700a of the cross member 700 is linear, while the mating edge 600c of the piercing tip 600 is bulging/curved, so the mating interaction may include a relatively substantial gap between the edges 600c, 700a when the shears 100 close to cut a workpiece.

Each of the main upper and lower main jaw bodies 200, 550 may comprise an integrally formed frame (e.g., an integrally cast frame, or a frame machined from a single piece of material (e.g., bar stock). Alternatively, each of the jaw bodies 200, 550 may comprise an assembly of separate components that are attached to each other to form each body 200, 550 (e.g., via bolts, welds, other fasteners, etc.). For example, the lower main jaw body 550 may be formed from a plurality of plates that are welded to each other.

Hereinafter, an anti-jamming system 800 of the lower jaw 120 according to one or more embodiments is described with reference to FIGS. 3, 4, and 13-14. A detachable guide blade insert 810 mounts to a guide blade holder 820, which can be inserted into a recess 830 (see FIGS. 3-4) formed between the lower main jaw body 550 and a lateral guide blade retainer body 840. Together, the guide blade holder 820 and guide blade insert 810 define a guide blade. However, in embodiments that omit a guide blade holder 820, the guide blade insert 810 itself may define the guide blade.

Figure 13:
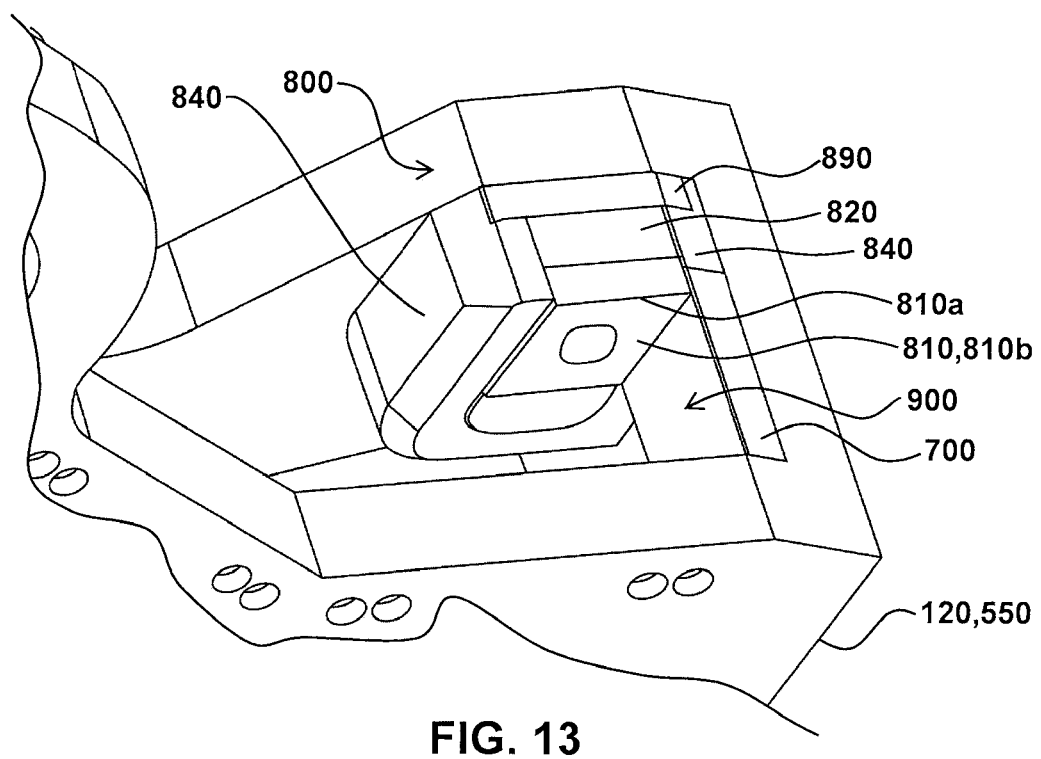
FIG. 13 is a partial, perspective upper view of a lower jaw of the shears of FIG. 1.

As shown in FIG. 13, the guide blade insert 810 includes a shearing edge 810a and a lateral guide surface 810b that face toward the primary blade insert 530 and its exposed cutting edge 530a and exposed lateral surface (see FIG. 2). The lateral guide surface 810b slidingly mates with the lateral surface 610b of the lateral support plate 610b of the upper jaw 110 when the jaws 110, 120 close.

Figure 14:
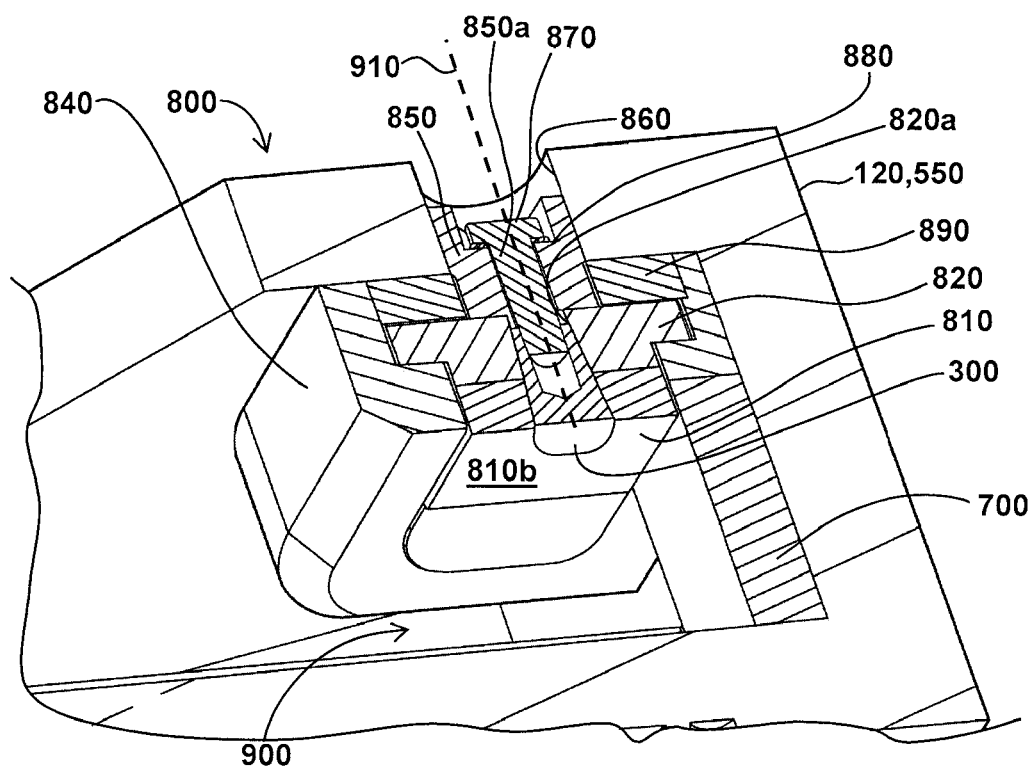
FIG. 14 is a partially cut-away/cross-sectional view of the lower jaw of the shears of FIG. 1.

The retainer body 840 and lower main jaw body 550 may be rigidly mounted to each other, for example via welds, as shown in FIG. 14. Alternatively, the retainer body 840 may be bolted to the lower main jaw body 550 bolts, for example as shown in FIGS. 22-25, and discussed in greater detail below. Alternatively, the retainer body 840 and lower main jaw body 550 may be integrally formed with each other (e.g., such that the recess 830 is formed by machining, casting, etc.). As shown in FIGS. 3, 4, and 14, an externally-threaded jack screw 850 threadingly engages an internally-threaded, laterally-extending hole 860 in the lower main jaw body 550. As shown in FIG. 14, the jack screw 850 includes a laterally extending, recessed-shoulder, non-threaded hole 850a. An outer lateral portion of the hole 850a (or some other portion of the jack screw 850) includes a polygonal (e.g., hexagonal) or otherwise non-circular shape that can be engaged by a rotational tool to rotate the jack screw 850 relative to the main jaw body 550, as described in greater detail below.

As shown in FIG. 14, a bolt 870 extends through the hole 850a, through a hole 820a of the guide blade holder 820, and into a threaded portion 300a of a wedge block 300. The wedge block 300 and bolt 870 firmly secure the blade insert 810 to the guide blade holder 820 and jack screw 850 in the same or similar manner as described above that wedge blocks 300 are used to secure other blade inserts to blade holders and jaw bodies. As shown in FIG. 4, a washer 880 may be disposed between a head of the bolt 870 and jack screw 850 to facilitate rotation of the bolt 870 relative to the jack screw 850 so as to (1) secure the jack screw 850, blade holder 820, and blade insert 810 to each other, or (2) detach the jack screw 850, blade holder 820, and blade insert 810 from each other. As shown in FIG. 14, a rotational axis 910 of the bolt 870 may be co-axial with a rotational axis of the jack screw 850, and parallel to the pivot axis 145. As shown in FIGS. 13-14, the jack screw 850 and bolt 870 may both be accessed from the left lateral side of the jaw 120 via the opening 860 for selective rotation of either the bolt 870 or the jack screw 850.

Hereinafter, assembly of the anti-jamming system 800 is described with reference to FIGS. 13-14. First, the blade holder 820 is dropped downwardly into the recess 830 (see FIG. 4). The blade holder 820 is moved laterally to the right (away from the hole 860) to seat the blade holder 820 against the retainer body 840. An elastically deformable insert 890 (e.g., a rubber block) is then dropped downwardly into the recess 830 between the blade holder 820 and a portion of the lower main jaw body 550 that forms the recess 830. The insert 890 tends to discourage debris from getting into the recess 830. The blade insert 810 is positioned on the blade holder 820, and the jack screw 850 is threaded into the hole 860. The bolt 870 is then extended through the holes in the jack screw 850, insert 890, blade holder 820, and threaded hole of the wedge block 300.

As shown in FIG. 2, a space 900 is formed between the lower primary blade insert 530 (including its cutting edge 530a), the cross member 700, and the guide blade insert 810. The piercing tip 600 and other parts of the front nose of the upper jaw 110 extend into this space when the jaws 110, 120 pivot closed during the shearing motion of the shears 100.

As shown in FIGS. 13-14, a lateral position of the guide blade 810 (and consequently a lateral width of the space 900) can be adjusted by pivoting the jack screw 850 about its axis to more the jack screw 850, blade holder 820, and guide blade insert 810 toward or away from the primary blade insert 530 on the opposing lateral side of the space 900. As shown in FIGS. 13 and 14, the jack screw 850 is typically adjusted so that the guide blade surface 810b projects slightly farther into the space 900 than an adjacent lateral surface of the retainer body 840. As a result, the blade insert 810b tends to act as a wear part during operation of the shears 100, and tends to protect the adjacent retainer body 840, which is typically tougher to repair or replace if worn.

During use of the shears 100, the nose portion of the upper jaw 110 sometimes gets jammed within the space 900, for example if workpiece material ends up (1) between the lower primary blade 530's lateral surface and the right-side lateral surfaces 600d, 620d of the upper jaw (see FIG. 8) and/or (2) between the guide blade's guide surface 810b and the left side lateral surfaces 610d, 600d (see FIG. 2) of the upper jaw 110. Such jammed material can sometimes melt and solder/weld the jaws 110, 120 to each other. To relieve such jamming, the jack screw 850 can be unscrewed (e.g., with a rotation tool) so as to draw the surface 810b away from the opposing blade insert 530 and cutting edge 530a, which laterally enlarges the space 900 and tends to help unjam the shears 100 so that the upper jaw 110 can be pivoted back out of the space 900 under the power of the piston/cylinder 150. In this manner, the anti-jamming system 800 can unjam the shears 100 without completely detaching (e.g., completely unbolting) any or all of the blades 530, 810 from the rest of the shears 100. As a result, according to one or more embodiments, once the shears 100 are unjammed, the jack screw 850 can be quickly and easily tightened to return the guide blade 810 to its regular lateral operating position relative to the rest of the lower jaw 120.

In the illustrated embodiment, the anti-jamming system 800 uses a lateral actuator in the form of a jack screw 850 to control the lateral positioning of the guide blade insert 810. However, according to alternative embodiments, any other lateral actuator could replace the jack screw 850 mechanism to effect the controlled lateral positioning of the guide blade insert 810 without deviating from the scope of the present invention (e.g., one or more linear actuator(s), hydraulic actuator(s) (e.g., piston/cylinder), wedge/shim/cam system(s), etc.). The guide blade insert 810 may be guided along its linear or non-linear (e.g., curved) lateral path via any suitable mechanism (e.g., a threaded connection that provides for lateral movement along the axis of the threads (as shown); mating rails, slots, projections, tracks, pins, holes, etc. on the insert 810 and lower jaw 120; a four-bar linkage).

According to various embodiments, the guide blade insert 810 and guide blade holder 820 may be integrated into a single piece (e.g., an integrally formed guide blade having the combined shape of the blade 610 and blade holder 820). According to various embodiments, the single piece guide blade may directly attach to the jack screw 850, for example via a bolt, without the use of a wedge block.

In the illustrated shears 100, the anti-jamming system 800 facilitates lateral adjustment of the guide blade 810. However, according to various alternative embodiments, the anti-jamming system 800 (e.g., the jackscrew 850, threaded hole in the jaw body 550) may additionally and/or alternatively be used to facilitate adjustment of any other blade or structure with a wear surface (e.g., the blade inserts 230, 240, 530, 540, 700, lateral support plates 610, 620) without deviating from the scope of the present invention. Alternatively, the anti-jamming system 800 could be omitted entirely according to various embodiments.

Figure 22:
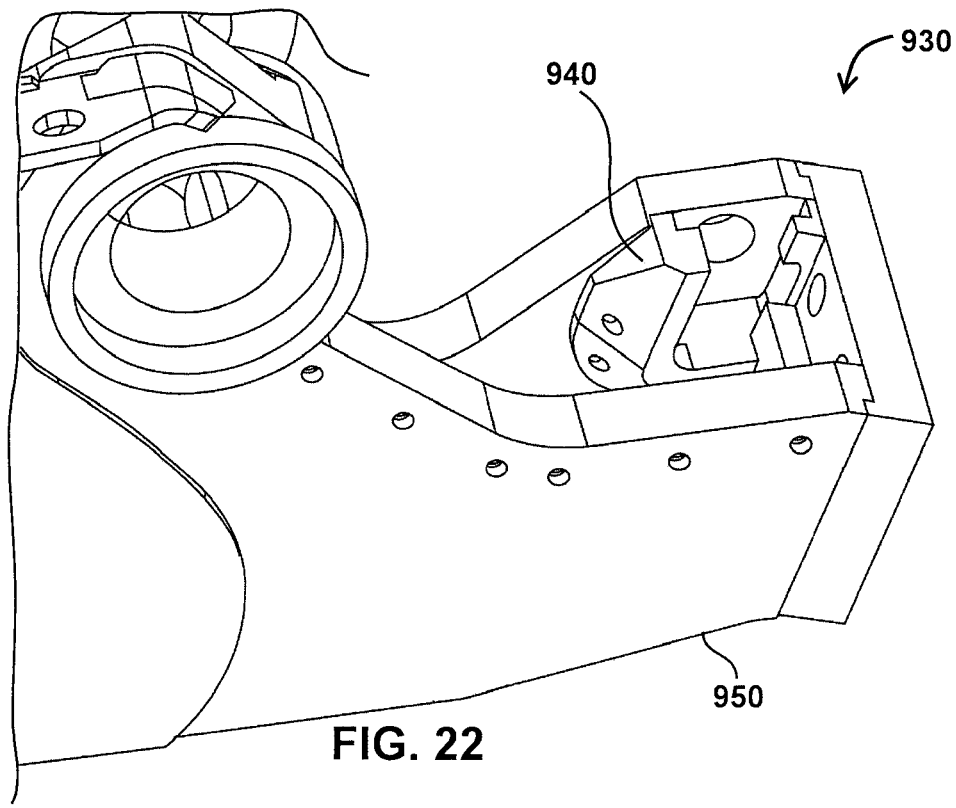
FIGS. 22-23 are partial perspective views of a lower jaw of a shears according to an alternative embodiment.
Figure 23:
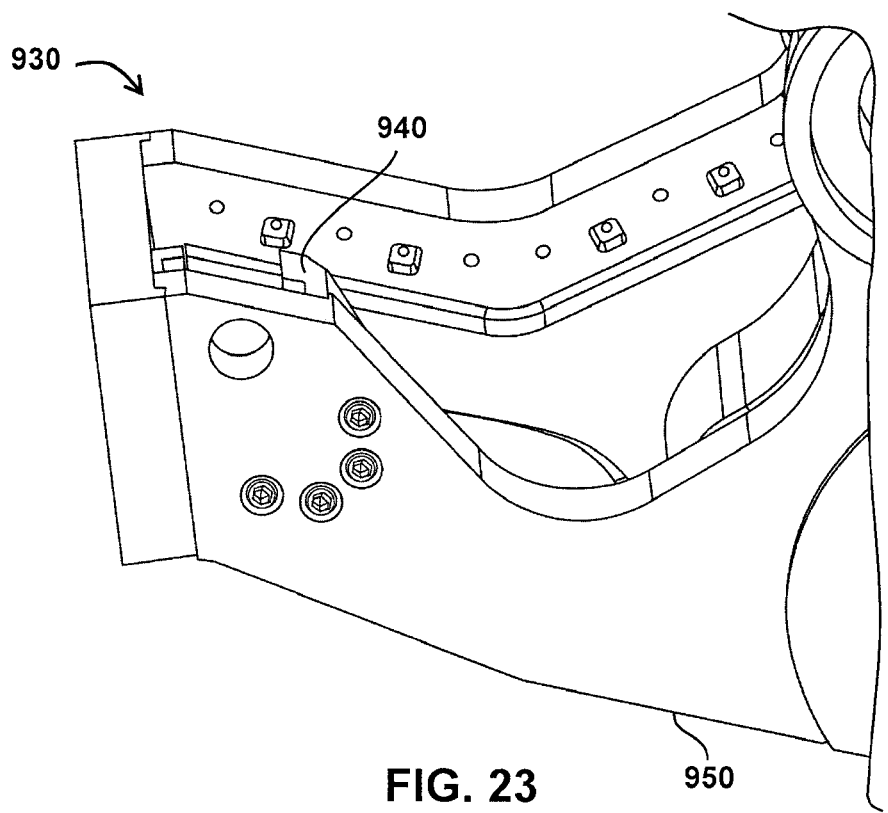

FIGS. 22-23 illustrate an alternative embodiment of a shears 930, which may be identical or similar to the shears 100, except that a lateral guide blade retainer body 940 and a lower main jaw body 950 are bolted together via bolts 960, rather than welded together.

Figure 24:
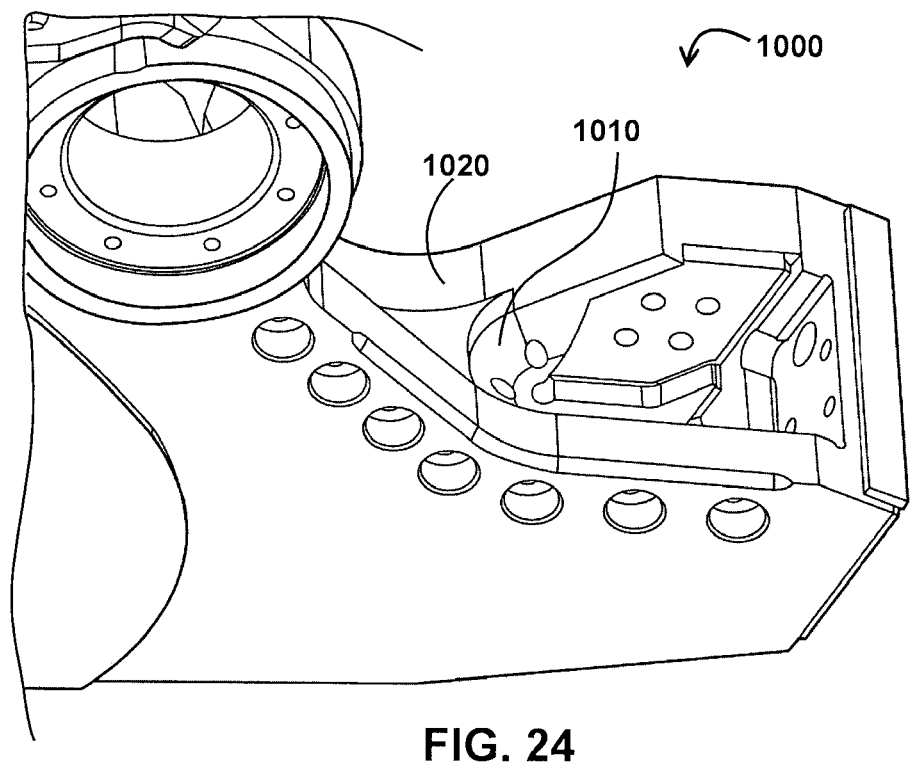
FIGS. 24-25 are partial perspective views of a lower jaw of a shears according to an alternative embodiment.
Figure 25:
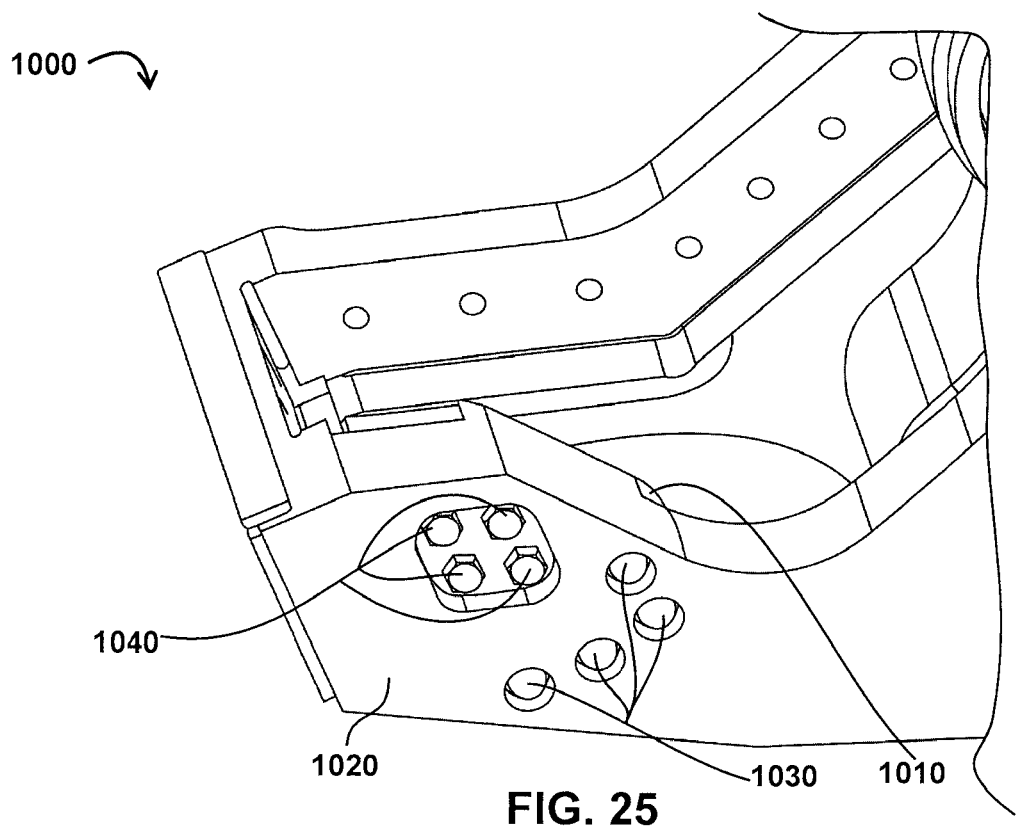

FIGS. 24-25 illustrate an alternative embodiment of a shears 1000, which may be identical or similar to the shears 930, except that the anti-jamming system 800 is omitted. A lateral guide blade retainer body 1010 and a lower main jaw body 1020 are bolted together via bolts 1030 (see FIG. 25). As shown in FIG. 25, a lateral guide blade is bolted to the lower main jaw body 1020 with bolts 1040 and shims (not shown).

The bolt-on retainer bodies 940, 1010 may be precisely machined before attachment to the lower main jaw body 950, 1020. According to various non-limiting embodiments, this pre-attachment machining may provide for precise and accurate positioning of the guide blade 810 (see FIG. 3). In one or more embodiments that rely on blade shimming (e.g., the shears 1000), the pre-attachment machining of the retainer body 1010 may lessen a possible dependence on shimming to precisely position the guide blade.

According to various non-limiting embodiments, the use of a bolt-on lateral guide blade retainer body 940, 1010, rather than a weld-on retainer body, may: (1) avoid the heat-induced distortions and weaknesses that sometimes occur with weld-on retainer bodies, (2) facilitate elimination of heat treatments before and/or after attaching the body 940, 1010 to the jaw 950, 1020, and/or (3) streamline the manufacturing process, as it is easier to precisely machine the body 940, 1010 before attachment to the jaw.

According to various non-limiting embodiments, the use of a bolt-on lateral guide blade retainer body 940, 1010, rather than a weld-on retainer body, simplifies the replacement and/or refurbishing of worn retainer bodies 940, 1010.

According to various non-limiting embodiments, the use of a bolt-on lateral guide blade retainer body 940, 1010, rather than a weld-on retainer body, may facilitate the use of easily-switched out modular sets of different combinations of piercing tips and guide blades. For example, one modular system may utilize a larger/wider piercing tip and laterally-narrower guide blade and retainer (resulting in a wider lateral space 900). Another modular system may utilize a narrower piercing tip and a laterally-wider guide blade and retainer (resulting in a narrower lateral space 900). Different modular combinations may have longer or shorter shearing edges along the guide blade. For example, in large pipe cutting applications it is sometimes an advantage to have a small guide seat and guide blade for clearance relative to the crushed pipe. In thin plate piercing applications it may be an advantage to have a longer guide blade edge to cut larger coupons.

In various of the above-described embodiments, components are described as being bolted together with bolts. However, according to various alternative embodiments, any other types of threaded fasteners (e.g., nuts, screws, etc.) or other fasteners (e.g., glue, clamps, etc.) may additionally and/or alternatively be used without deviating from the scope of various embodiments.

According to various embodiments, replaceable wear parts (e.g., the blade inserts 230, 240, 530, 540, 700, 810, the blade holders 210, 220, 510, 520, 820, lateral support plates 610, 620) stand out from adjacent surfaces of less-easily replaceable parts (e.g., the main upper and lower bodies 200, 500) so as to better protect the less-easily replaceable and/or larger parts from wear. For example, as best shown in FIG. 6, exposed lateral surfaces 210e, 220e of the blade holders 210, 220 stand out laterally from an adjacent lateral surface 200d of the main body 200 by a distance a. Similarly, as shown in FIG. 6, exposed lateral surfaces 230d, 240d of the smaller blade inserts 230, 240 stand out from the exposed lateral surfaces 210e, 220e of the larger blade holders 210, 220 by a distance b. According to various embodiments, the distances/stand-outs a, b may be (a) at least 0.001, 0.003, 0.005, 0.01, 0.015, 0.02, and/or 0.03 inches, (b) less than 0.5, 0.1, 0.05, 0.04, and/or 0.03 inches, and/or (c) between any two such upper and lower values (e.g., between 0.001 and 0.5 inches, between 0.003 and 0.05 inches), as measured in the lateral direction (i.e., a direction parallel to the pivot axis 145). The standout a tends to cause the surface 210e, 220e to act as a wear surface during operation of the shears 100 and tends to protect the relatively depressed/offset surface 200d of the main body 200. According to one embodiment, the standout a is about 0.01 inches, and the standout b is about 0.02 inches. The standouts between other wear parts, and less-easily replaceable parts can be in the same range of values.

According to various embodiments, the shears 100 are heavy-duty, large shears 100 that are configured to handle large, heavy, and/or strong metal (e.g., steel, iron, etc.) workpieces. According to various embodiments, a distalmost point of any cutting/shearing/piercing edge of the upper jaw 100 (the forwardmost point on the piercing edge 600c in the illustrated embodiment) is (1) at least 10, 15, 20, 22, 24, 26, 28, 30, 32, 34, 36, 38, and/or 40 inches from the pivot axis 145, (2) less than 100, 50, 40, and/or 30 inches from the pivot axis 145, (3) between 10 and 100 inches from the pivot axis, and/or (4) between any two such distances. According to various embodiments, the shears 100 (not including hydraulic fluid) weighs (1) at least 100, 200, 300, 400, 500, 750, 1000, 1250, 1500, 2000, 3000, 4000, 5000, 6000, 7000, 8000, 9000, and/or 10000 pounds, (2) less than 200,000, 150,000, 125,000, 100,000, 90,000, 80,000, 70,000, 60,000, 50,000, 40,000, 30,000, 20,000, and/or 10,000 pounds, and/or (3) between any two such weights. According to various embodiments an internal diameter of the cylinder of the piston/cylinder 150 is (1) at least 3, 4, 5, 6, 7, 8, 9, 10, 12, 18, and/or 20 inches, (2) less than 60, 50, 40, 30, 25, and/or 20 inches, and/or (3) anywhere between any two such diameter.

Unless otherwise specifically stated herein, the lateral direction of the shears 100 means a direction parallel to the pivot axis 145, and the front end of the shears 100 is the end with the opening between the jaws 110, 120.

Unless otherwise specifically stated herein, the upper jaw 110 includes all components that move with the main upper jaw body 200 relative to the lower jaw 120 when the jaws 110, 120 pivot in their shearing motion. Similarly, unless otherwise specifically stated herein, the lower jaw 120 includes all components that move with the lower main jaw body 550 relative to the upper jaw 110 when the jaws 110, 120 pivot in their shearing motion.

Figure 26:
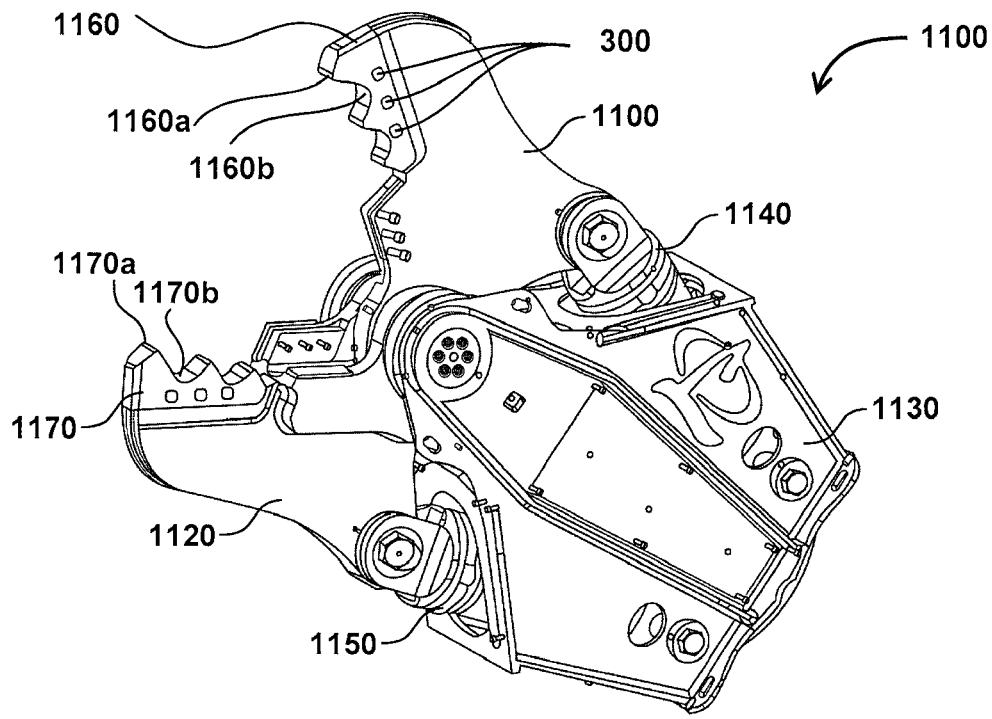
FIG. 26 is a perspective view of an alternative embodiment of a material processor.
Figure 27:
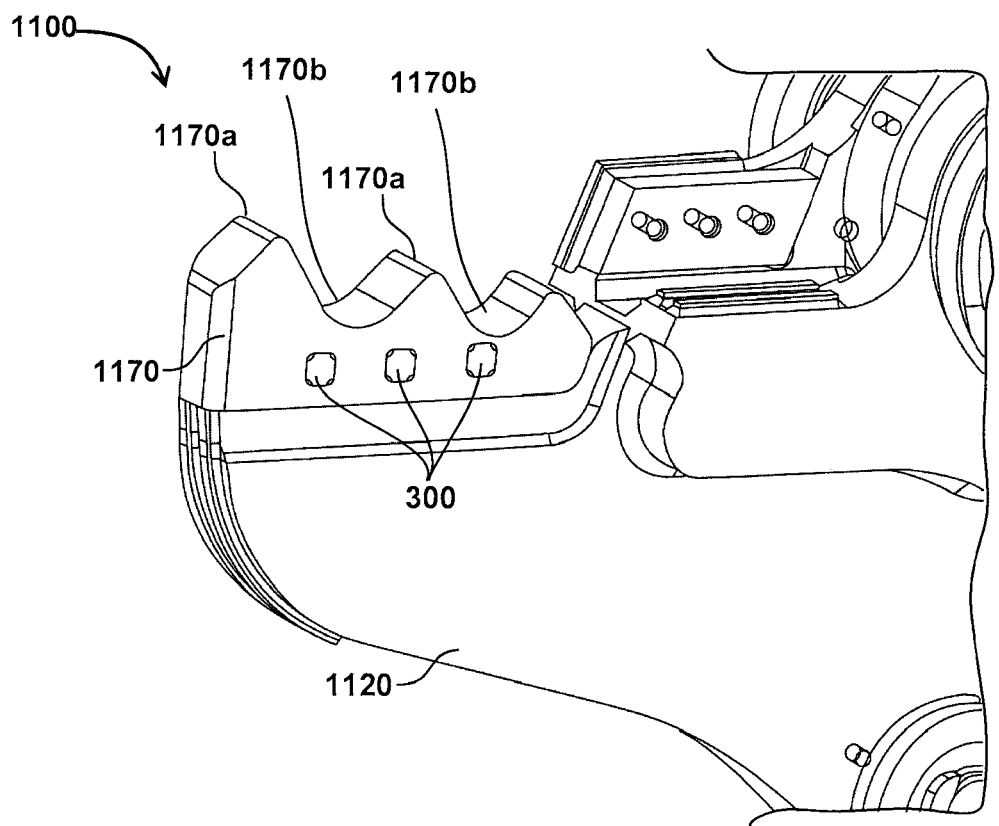
FIG. 27 is a detail view of the material processor in FIG. 26.
Figure 28:
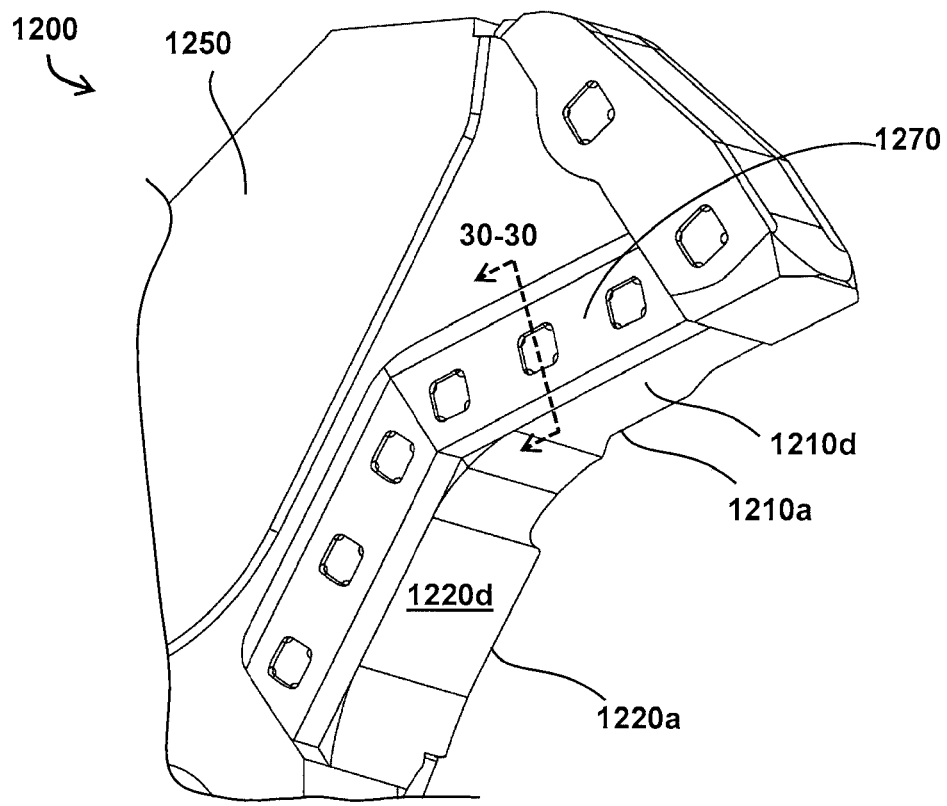
FIG. 28 is a partial perspective view of an upper jaw of a shears according to an alternative embodiment.
Figure 29:
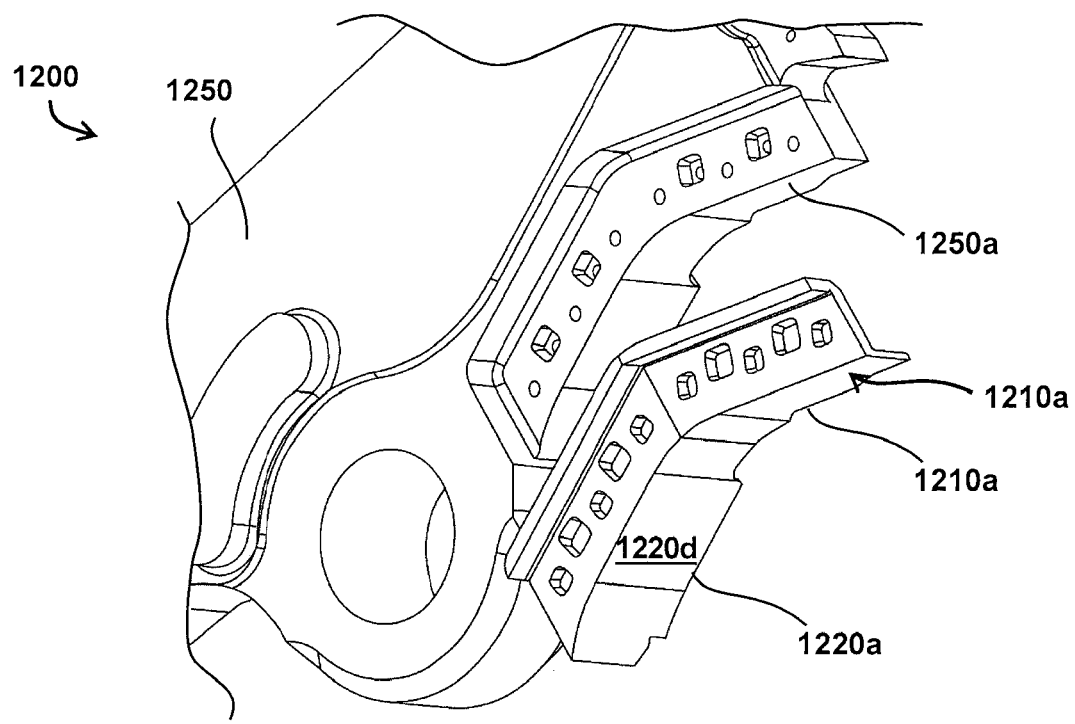
FIG. 29 is a partially exploded perspective view of the upper jaw of FIG. 28.

In the above-described embodiments, the material processor comprises a shears that includes blade inserts that have cutting edges that interact in a shearing manner. However, according to alternative embodiments, the material processor may additionally and/or alternatively be other types of heavy-duty material processors (e.g., concrete pulverizer/crusher, shears, universal processor). For example, as shown in FIGS. 26-27, according to various alternative embodiments, the material processor comprises a concrete crusher 1100 that includes upper and lower jaws 1110, 1120 that are pivotally connected to each other and a machine-mountable frame 1130. The frame 1130 is configured to mount the concrete crusher 1100 to a construction vehicle (e.g., the boom of an excavator, back hoe, etc.). Respective hydraulic piston/cylinders 1140,1150 extend between the frame 1130 and a respective one of the jaws 1110, 1120 to pivotally drive the jaws 1110, 1120 between an open position (shown in FIG. 26) and a closed position in which the jaws 1110, 1120 are near each other. Concrete-crushing/pulverizing blade inserts 1160, 1170 include concrete-crushing/pulverizing projections 1160a, 1170a and/or recesses 1160b, 1170b (either in addition to or in the alternative to cutting edges that are designed to shearingly interact) that interact with each other in an anvil, rather than shearing, manner. In the illustrated processor 1100, additional shearing blade inserts with shearing cutting edges are provided and do interact in a shearing manner.

In the processor 1100, the blade inserts 1160, 1170 mount to their respective jaws 1110, 1120 via the same or similar wedge blocks 300 as discussed above. Accordingly, a redundant explanation of the structure and operation of the wedge blocks 300 is omitted.

According to various alternative embodiments, the shears 100 may be converted into a concrete crusher by replacing one or more of the cutting blade inserts 230, 240, 530, 540 and/or piercing tip insert 600 with concrete-crushing blade inserts/piercing tips 1160, 1170. According to various embodiments, one or more of the blade inserts may include any type of suitable material-processing surface features (e.g., cutting edge(s), crushing surface(s) such as projections and/or recesses).

Figure 32:
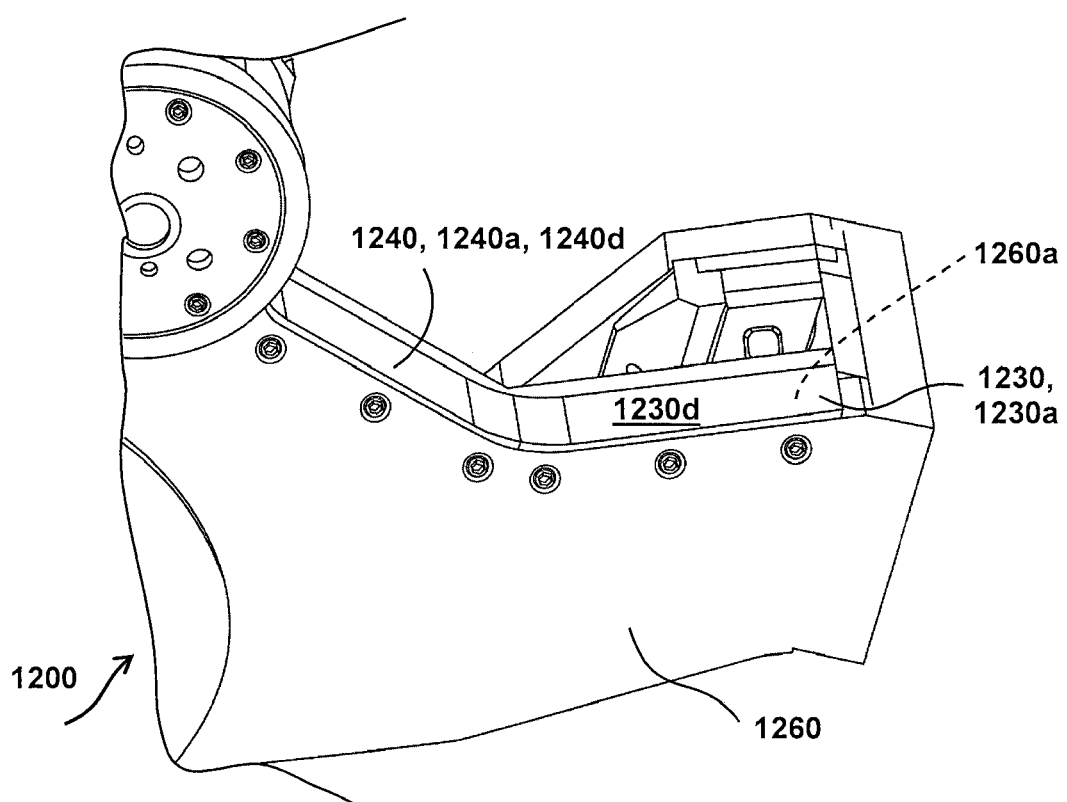
FIG. 32 is a partial perspective view of a lower jaw of the shears in FIG. 28.

FIGS. 28-32 illustrate an alternative embodiment of a shears 1200. Except where otherwise stated, the shears 1200 is similar or identical to any of the above-discussed shears 100, 930, 1000, so a redundant explanation of similar or identical features is omitted. As shown in FIGS. 28-31, the shears 1200 differ from the above-discussed shears in that the upper blade holders 1210, 1220 (see FIGS. 28-31) include jaw cover segments 1210a, 1220a that extend horizontally from a remainder of the blade holders laterally across a lower surface 1250a (see FIGS. 29-30) of the upper jaw 1250. As shown in FIG. 32, the shears 1200 also differ from the above-discussed shears in that the lower blade holders 1230, 1240 extend horizontally from a remainder of the blade holders laterally across the upper surface 1260a (see FIG. 32) of the lower jaw 1260. The blade holders 1210, 1220, 1230, 1240 therefore provide replaceable wear parts that protect/cover the facing surfaces 1250a, 1260a of the main bodies of the underlying jaws 1250, 1260, respectively, from wear and tear as the shears 1200 are used to process material.

In the illustrated shears 1200, the segments 1210a, 1220a, 1230a, 1240a extend laterally all the way across the faces 1250a, 1260a of their respective jaws 1250, 1260 and fully cover the faces 1250*a*, 1260*a* over the longitudinal length of the blade holders 1210, 1220, 1230, 1240 (i.e., in a direction that extends from a pivot axis of the shears' jaws toward the jaws' distal ends (e.g., the piercing tip of the upper jaw 1250, and the cross member of the lower jaw 1260). However, according to alternative embodiments, one or more of the segments 1210*a*, 1220*a*, 1230*a*, 1240*a* may not provide full coverage, such that portion(s) of the faces 1250*a*, 1260*a* remain exposed.

Figure 30:
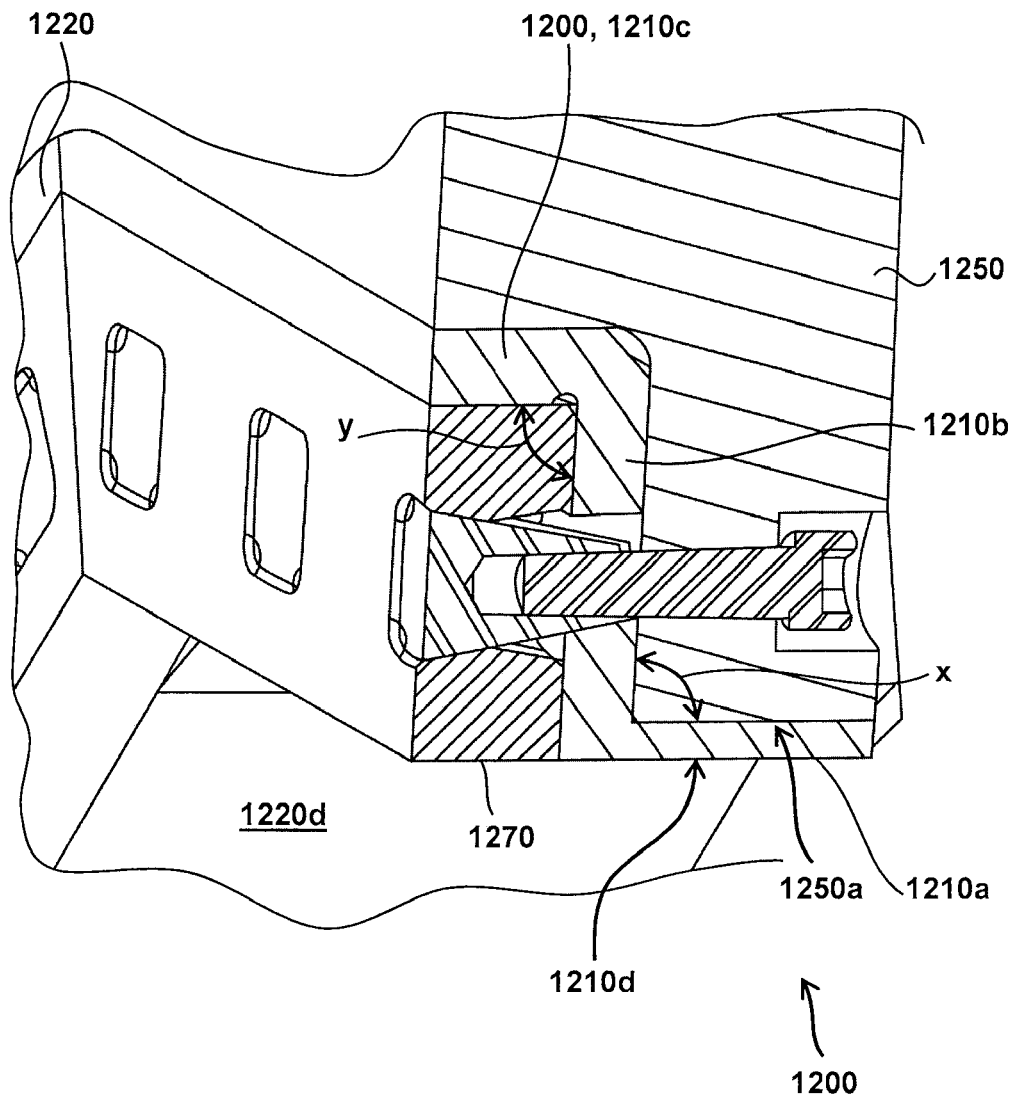
FIG. 30 is a partial cross-sectional view of the upper jaw in FIG. 28, taken along the line 30-30 in FIG. 28.
Figure 31:
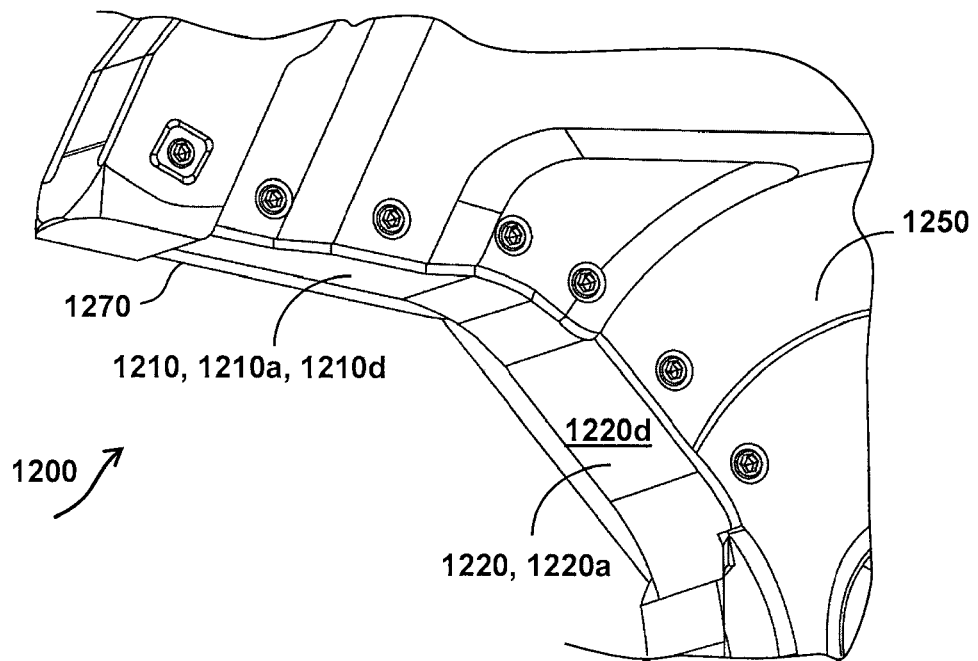
FIG. 31 is a partial perspective view of the upper jaw in FIG. 28.

FIG. 30 is a cross-sectional view of the blade holder 1210. It should be understood that the following description of the blade holder 1210 applies equally and analogously to the other blade holders 1220, 1230, 1240. As with the blade holder 220 of the shears 100, the blade holder 1210 of the shears 1200 includes a vertical segment 1210*b* and a horizontal segment 1210*c* that together define an "L" shaped blade insert seat surface for the blade insert 1270. The segments 1210*a*, 1210*b* likewise intersect with each other so as to form an "L" shape. The segments 1210*a*, 1210*c* are preferably generally parallel to each other and each extend from the segment 1210*b* in opposite horizontal directions (i.e., opposite lateral directions parallel to the pivot axis of the jaws 1250, 1260). Thus, the segment 1210*a* extends horizontally from the segment 1210*b* in a direction opposite the blade insert 1270.

As viewed in cross-section (e.g., as shown in FIG. 30) and/or from a longitudinal end thereof, the blade holders 1210, 1220, 1230, 1240 each have a "Z" shape. As used herein, "Z" shaped includes a backward/mirror image of a "Z" and according to various non-limiting embodiments, the frontward or backward appearance of the "Z" depends on which longitudinal end the blade holder is viewed from.

In the shears 1200 illustrated in FIG. 30, the segments 1210*a*, 1210*b* and segments 1210*b*,1210*c* meet each other at angles x,y, respectively, as viewed in cross-section (as shown in FIG. 30) and/or from a longitudinal end of the blade holder 1210 so as to form the Z shape. The segments 1210*a*, 12010*c* form the distal arms of the Z shape, while the segment 1210*b* forms a central portion of the Z shape.

In the illustrated embodiment, the angles x,y are 90° such that the Z shape also has a stepped shape. However, according to alternative embodiments, the angle(s) x and/or y of the Z shape may be acute or obtuse or one angle x,y may be acute while the other angle x,y is obtuse. According to various embodiments, each angle x,y may be greater than 45, 50, 55, 60, 65, 70, 75, 80, 85, 90, 95, 100, 105, 110, 115, 120, 125, 130, and/or 135°, less than 135, 130, 125, 120, 115, 110, 105, 100, 95, 90, 85, 80, 85, 80, 75, 70, 65, 60, 55, 50, and/or 45°, and/or between 45° and 135°, between 60° and 120°, between 70° and 110°, and/or between 80° and 1000. The angle x may be the same as or different than the angle y.

In the embodiment shown in FIG. 30, the angles x,y formed between the segments 1210*a*/1210*b*, 1210*b*/1210*c* form relatively sharp vertexes, though the vertex of the angle x is shown as being sharper than the vertex of the angle y, which has a more rounded shape at the outer part of the angle. However, according to alternative embodiments, one or both of the angles x,y may be sharper or less sharp (e.g., more curved, chamfered, etc.) than in the illustrated shears 1200. One of the angles x,y may be sharper, while the other is less sharp.

The segments 1210*a*, 1210*c* are offset from each other in a direction of travel of the upper jaw 1250 relative to the lower jaw 1260. As a result, as viewed in FIG. 30, the segment 1210*a* is lower than the segment 1210*c* and closer to the lower jaw 1260 (when the jaws 1250,1260 are open).

In the illustrated embodiment, the segments 1210*a*, 1210*b*, 1210*c* that form the Z shape are substantially planar (e.g., plate-like) and have a substantially uniform thickness. However, according to alternative embodiments, one, two, and/or all three of the segments 1210*a*, 1210*b*, 1210*c* that form the Z shape may have simple and/or complex other shapes (e.g., simple or compound curves, shapes that are thinner in one part than in another, shapes that gradually thicken along any direction of the segment).

As shown in FIGS. 28-32, the segments 1210*a*, 1220*a*, 1230*a*, 1240*a* define exposed horizontal faces 1210*c*, 1220*d*, 1230*d*, 1240*d* that are generally parallel to a pivotal axis of the shear jaws 1250, 1260. These surfaces 1210*c*, 1220*d*, 1230*d*, 1240*d* face the respective opposing jaw 1250, 1260. Thus, the surfaces 1210*c*, 1220*d* face the lower jaw 1260, and the surfaces 1230*d*, 1240*d* face the upper jaw 1250.

In the illustrated embodiment, the segments 1210*a*, 1210*b*, 1210*c* of the blade holder 1210 are integrated into a common, integral body that defines the blade holder 12010. Alternatively, the segments 1210*a*, 1210*b*, 1210*c* may comprise discrete bodies that are mounted to each other and/or to the underlying jaw (e.g., via wedge blocks, bolts, etc.).

In use, the blade holders 1210, 1220, 1230, 1240 help to protect the underlying jaw bodies of the jaws 1250, 1260 during use of the shears 1200, and may be replaced with fresh blade holders 1210, 1220, 1230 when worn.

According to various embodiments, the blade holders 1210, 1230 may be identical to each other and/or interchangeable such that a single SKU or part number may be used for both. Similarly, the blade holders 1220, 1240 may be identical to each other and/or interchangeable such that a single SKU or part number may be used for both.

The sliding wear surfaces of any of the replaceable wear parts discussed herein (e.g., the blade insert(s) 230, 240, 530, 540, 1270 the blade holder(s) 210, 210', 210", 210"', 220, 220', 220", 220"', 510, 520, 1210, 1220, 1230, 1240, the lateral support plates 610, 620, the piercing tips 600, 660, 670, 680 the guide blade 810, the cross member 700) may have a low-friction surface coating. For example, as shown in FIG. 6, the shearing/sliding surfaces 240*a*, 240*d* of the blade insert 240 may have a low-friction coating so as to reduce sliding friction during operation of the shears.

While such low-friction coatings may be used with any of the above-described shears, the low-friction coatings are particularly well-suited for use on indexable wear parts that index by flipping over and are mounted to the shears via a wedge block. In non-limiting examples of such embodiments (e.g., as shown in FIG. 6), the wedge blocks 300 act as bosses/dowels between the insert 240 and the blade holder 220 (or underlying jaw body, depending on the embodiment) to resist pull-out of the insert 240 from the jaw when the shears are opening. In such embodiments, the co-efficient of friction between the wear part surface 240*a* and abutting surface of the underlying jaw or blade holder can be lower while still providing sufficient holding force. In contrast, if the non-used surfaces of conventional indexable wear parts had low-friction surface coatings, the reduced friction between the part and the underlying jaw could disadvantageously increase the risk that the wear part would pull out from (e.g., separate from/shear from) the underlying jaw.

According to various non-limiting embodiments, the low-friction coating is impregnated or coated onto the tool surface before the wear part is mounted to the shears. According to various embodiments, low-friction coating comprises a rigid coating (e.g., titanium nitride, titanium carbonitride, aluminum titanium nitride, chromium nitride, Diamolith DLC, Nitron MC, or Nitron CA). According to various embodiments, low-friction coating is bonded to the underlying wear part (e.g., via heat, chemical bond, etc.). According to various embodiments, the low-friction coating may be formed/applied during manufacture of the wear part. According to various embodiments, the low-friction coating comprises a low-friction coating for use in dry-cutting (i.e., cutting without the use of lubricants/cooling fluids (e.g., oil, grease)). As used herein, the term "low-friction coating" does not include temporary lubricants (e.g., oil, grease).

The foregoing illustrated embodiments are provided to illustrate the structural and functional principles of various embodiments and are not intended to be limiting. To the contrary, the principles of the present invention are intended to encompass any and all changes, alterations and/or substitutions thereof (e.g., an alterations within the spirit and scope of the following claims).

What is claimed is:

1. A material processor comprising:
    a first jaw with a first material-processing surface feature; and
    a second jaw with a second material-processing surface feature,
    wherein the first and second jaws are pivotally connected such that at least one of the jaws is pivotally movable relative to the other jaw,
    wherein the first jaw comprises:
        a first jaw body with a blade seat surface,
        a blade seated on the blade seat surface, the blade defining at least a portion of the first material-processing surface feature,
        a wedge block having (a) a first wedge surface that engages a surface of the first jaw body, and (b) a second wedge surface that engages a surface of the blade, and
        a fastener that mounts the wedge block to the first jaw, the fastener applying a force to the wedge block in a force-applying direction that is angled relative to one of the first and second wedge surfaces such that (1) the force urges the blade into engagement with blade seat surface in the force-applying direction, and (2) the force urges, via the first and second wedge surfaces, the blade into engagement with the blade seat surface in a direction different from the force-applying direction.

2. The material processor of claim 1, wherein:
    the material processor comprises a shears;
    the first material-processing surface feature comprises a first cutting edge;
    the second material-processing surface feature comprises a second cutting edge; and
    the second cutting edge is shaped and positioned to shearingly interact with the first cutting edge when the at least one of the jaws pivots in a shearing motion.

3. The material processor of claim 1; further comprising a piston/cylinder operatively connected to the first and second jaws and configured to pivotally drive the at least one of the jaws relative to the other jaw.

4. The material processor of claim 1, wherein the blade comprises a low-friction coating on at least one wear surface thereof.

5. The material processor of claim 1, wherein the first and second wedge surfaces form a non-zero acute angle with each other.

6. The material processor of claim 1, wherein:
    the first jaw body comprises a first main body and a first detachable blade holder that is detachably mounted to the first main body,
    the first detachable blade holder includes (1) the blade seat surface and (2) the surface of the first jaw body that engages the first wedge surface, and
    the first main body includes a blade holder seat surface that abuts a mounting surface of the blade holder.

7. The material processor of claim 6, wherein:
    the first detachable blade holder includes two segments that intersect each other at an angle,
    an inside edge is formed in the blade seat surface along the intersection between the two segments,
    an outside edge is formed in the mounting surface of the blade holder along the intersection between the two segments, and
    the inside edge is sharper than the outside edge.

8. The material processor of claim 6, wherein:
    the blade seat surface has a first surface portion that extends in a direction perpendicular to the force-applying direction,
    the force urges the blade into engagement with the first surface portion,
    the blade seat surface has a second surface portion that extends in a direction parallel to the force-applying direction, and
    the force urges, via the first and second wedge surfaces, the blade into engagement with the second surface portion.

9. The material processor of claim 6, wherein:
    the blade seat surface includes first and second surface portions that abut mating surfaces of the blade, and
    the first and second surface portions intersect each other at an inside edge.

10. The material processor of claim 9, wherein:
    the material processor comprises a shears,
    the first material-processing surface feature comprises a first cutting edge,
    the blade is at least two-way indexable such that the blade includes at least the cutting edge and a second cutting edge, and
    the second cutting edge extends along the inside edge formed between the first and second surface portions of the blade seat surface.

11. The material processor of claim 10, wherein the blade comprises a low-friction coating on at least two opposing wear surfaces thereof.

12. The material processor of claim 10, wherein the blade is at least four-way indexable such that the blade includes third and fourth cutting edges, wherein the blade may be repositioned such that any one of the first through fourth cutting edges is disposed in an exposed working position for shearing action during the shearing motion.

13. The material processor of claim 9, wherein:
    the mounting surface of the blade holder includes first and second portions that intersect each other along an outside edge that is less sharp than the first cutting edge.

14. The material processor of claim 1, wherein:
    the blade is at least two-way indexable, and includes first and second shearing wear surfaces on first and second sides of the blade, respectively,
    the first side is opposite the second side, and
    the first and second shearing wear surfaces each have a low-friction coating.

15. The material processor of claim 1, wherein a front nose portion of one of the jaws comprises a detachable piercing tip that includes a bulging piercing edge.

16. The material processor of claim 15, wherein the bulging piercing edge is round.

17. The material processor of claim 1, wherein:
the first jaw comprises a first guide surface; and
the second jaw comprises:
- a guide blade that defines a second guide surface that faces toward the second material-processing surface feature such that a space is formed between the second material-processing surface feature and the second guide surface, wherein sufficient pivotal movement of the at least one of the jaws would cause at least a portion of the first jaw to move into the space, and
- a lateral actuator that is configured to selectively move the second guide blade relative to the second material-processing surface feature so as change a lateral width of the space.

18. The material processor of claim 9, wherein:
the first jaw body comprises a first main body and a first detachable blade holder that is detachably mounted to the first main body,
the first detachable blade holder comprises a first segment, a second segment that extends laterally away from the first segment in a direction of the blade, and a third segment that extends laterally away from the first segment,
the first and second segments together define the blade seat surface,
the third segment at least partially covers a surface of the first main body that faces the second jaw.

19. The material processor of claim 1, wherein:
the blade comprises a through-hole;
the surface of the blade that engages the second wedge surface is formed by the through-hole; and
the wedge block extends into the through-hole.

20. The material processor of claim 19, wherein the fastener extends into the through-hole.

21. The material processor of claim 19, wherein a cross-sectional shape of the through-hole, taken in a plane that is perpendicular to a through-direction of the through-hole, is non-circular.

22. The material processor of claim 1, wherein:
the first and second jaws are pivotally connected such that the at least one of the jaws is pivotally movable relative to the other jaw about a jaw pivot axis; and
the fastener defines an axis of rotation and movement that is parallel to the jaw pivot axis.

23. The material processor of claim 1, wherein the force-applying direction forms a non-zero angle with the surface of the blade insert.

* * * * *